US011566834B2

(12) United States Patent
Van Bokkelen et al.

(10) Patent No.: US 11,566,834 B2
(45) Date of Patent: Jan. 31, 2023

(54) APPARATUS AND METHOD FOR CRYOSTORAGE AND MANIPULATION OF A PLURALITY OF CONTAINER UNITS

(71) Applicant: ABT Holding Company, Cleveland, OH (US)

(72) Inventors: Gil Bradford Van Bokkelen, Hudson, OH (US); Rakesh Ramachandran, Solon, OH (US); Christopher Robert Bruns, Seven Hills, OH (US); Christopher John Hayes, Fishers, IN (US); John A. Corey, Melrose, NY (US); Troy M. Coolidge, Victoria, MN (US); Bruce E. Frohman, Plymouth, MN (US); Joseph Gordon, Mansfield, MA (US); Thomas R. Ruth, South Easton, MA (US); Jacob T. Williams, Golden Valley, MN (US); Gregory E. Kramer, Minneapolis, MN (US); Nathan A. Abel, Minneapolis, MN (US); David J. Copeland, Minnetonka, MN (US); Matthew R. Gill, Ridgewood, NY (US); Steven F. Shane, Edina, MN (US)

(73) Assignee: ABT Holding Company, Cleveland, OH (US)

( * ) Notice: Subject to any disclaimer, the term of this patent is extended or adjusted under 35 U.S.C. 154(b) by 250 days.

(21) Appl. No.: 16/872,219

(22) Filed: May 11, 2020

(65) Prior Publication Data

US 2020/0363116 A1    Nov. 19, 2020

Related U.S. Application Data

(60) Provisional application No. 62/846,971, filed on May 13, 2019.

(51) Int. Cl.
*F25D 11/04* (2006.01)
*B01L 7/00* (2006.01)
(Continued)

(52) U.S. Cl.
CPC ............ *F25D 11/04* (2013.01); *B01L 7/50* (2013.01); *B25J 21/00* (2013.01); *F25D 25/04* (2013.01);
(Continued)

(58) Field of Classification Search
CPC ........ F25D 11/04; F25D 25/04; F25D 29/001; F25D 2700/122; B25J 21/00; B01L 7/50; B01L 2200/18
See application file for complete search history.

(56) References Cited

U.S. PATENT DOCUMENTS 5,205,128 A    4/1993 Richard
5,233,844 A *  8/1993 Knippscheer ........ A01N 1/0252
                                        414/331.05
(Continued)

FOREIGN PATENT DOCUMENTS

DE    0275829 A2 *  7/1988  ............. F25D 11/04
WO    2005/098762 A1    10/2005
(Continued)

OTHER PUBLICATIONS

English Translation EP-0275829-A2 (Year: 1988).*
(Continued)

*Primary Examiner* — David J Teitelbaum
(74) *Attorney, Agent, or Firm* — Tarolli, Sundheim, Covell & Tummino LLP

(57) ABSTRACT

An apparatus for cryostorage and manipulation of a plurality of container units includes a cryochamber having a cryo-access port. The cryochamber is electrically cooled at cryogenic temperatures. A unit holder is located inside the
(Continued)

cryochamber and is configured to hold a plurality of container units. A user access area is provided for selectively permitting access to a chosen container unit by an authenticated user who has been authenticated by the apparatus. A motive grasper is provided for selectively removing the chosen container unit from the cryochamber through the cryo-access port, and selectively placing the chosen container unit into the user access area.

11 Claims, 18 Drawing Sheets

(51) Int. Cl.
  *B25J 21/00* (2006.01)
  *F25D 25/04* (2006.01)
  *F25D 29/00* (2006.01)

(52) U.S. Cl.
  CPC ........ *F25D 29/001* (2013.01); *B01L 2200/18* (2013.01); *F25D 2700/122* (2013.01)

(56) References Cited

U.S. PATENT DOCUMENTS

| | | | |
|---|---|---|---|
| 7,635,246 B2 * | 12/2009 | Neeper | G01N 35/0099 |
| | | | 414/280 |
| 8,534,079 B2 | 9/2013 | Brooks | |
| 10,251,389 B2 | 4/2019 | Karnieli et al. | |
| 10,336,539 B2 | 7/2019 | Caveney et al. | |
| 10,421,607 B2 * | 9/2019 | Caveney | A01N 1/0236 |
| 2004/0115101 A1 * | 6/2004 | Malin | G01N 35/04 |
| | | | 422/430 |
| 2006/0010881 A1 | 1/2006 | Gustafson | |
| 2008/0256227 A1 * | 10/2008 | Malin | H04L 67/025 |
| | | | 711/E12.002 |
| 2012/0134898 A1 * | 5/2012 | Malin | F25D 13/06 |
| | | | 422/559 |
| 2015/0125138 A1 * | 5/2015 | Karnieli | A01N 1/0242 |
| | | | 392/441 |
| 2016/0223248 A1 | 8/2016 | Bowdish | |
| 2016/0363605 A1 * | 12/2016 | Liepold | F24F 3/167 |
| 2019/0137163 A1 | 5/2019 | Corey et al. | |
| 2020/0025782 A1 * | 1/2020 | Ahlfors | G01N 35/0099 |
| 2020/0124626 A1 * | 4/2020 | Bittner | C12M 41/48 |

FOREIGN PATENT DOCUMENTS

| | | |
|---|---|---|
| WO | 2013/020032 A2 | 2/2013 |
| WO | 2016/089440 A1 | 6/2016 |

OTHER PUBLICATIONS

WIPO International Search Report and Written Opinion issued in related Appl. No. PCT/US2020/032374, dated Aug. 28, 2020.
Thermo Scientific, CRYO Plus 1, 2, 3, and 4, Model 7400 Series Liquid Nitrogen Storage System, Operating and Maintenance Manual 7007400 Rev. 21, 1998.
Brooks Life Sciences, Specifications for BioStore Cryo Semi-Automated Freezer, https://www.brookslifesciencies.com/products/biostore-cryo-semi-automated-freezer, 2020.
Brooks Life Sciences Systems, BioStore III Cryo Brochure/Specifications, www.brooks.com/lifescience, 2017.
Brooks Life Sciences, News Release—Brooks Life Sciences Introduces the First Automated Cryogenic Freezer for 250mL Cryobags, https://www.brookslifesciences.com/news/brooks-life-sciences-introduces-first-automated-cryogenic-freezer-250ml-cryobags, May 8, 2018.
Chart Inc. Biomedical Group, New Product Release, MVE FusionTM Series, 2017.
Carefusion, Pyxis C"Safe System Brochure, 2015.
Chart Industries, MVE Fusion Series Freezers Brochure, ML-CRYO0039 B 1, 2017.
Chart Industries, MVE Fusion Series Freezers Brochure, ML-CRYO0039 C 2, 2017.
Biolife Solutions, Specifications for ThawSTAR CFT1.5 Automated System for Thawing Cells, https://www.biolifesolutions.com/product/thawstar-cft1-5-thawing-cells, 2019.
Trumed Systems, Inc., Specifications for AccuVax Vaccine Management System, 2017.

* cited by examiner

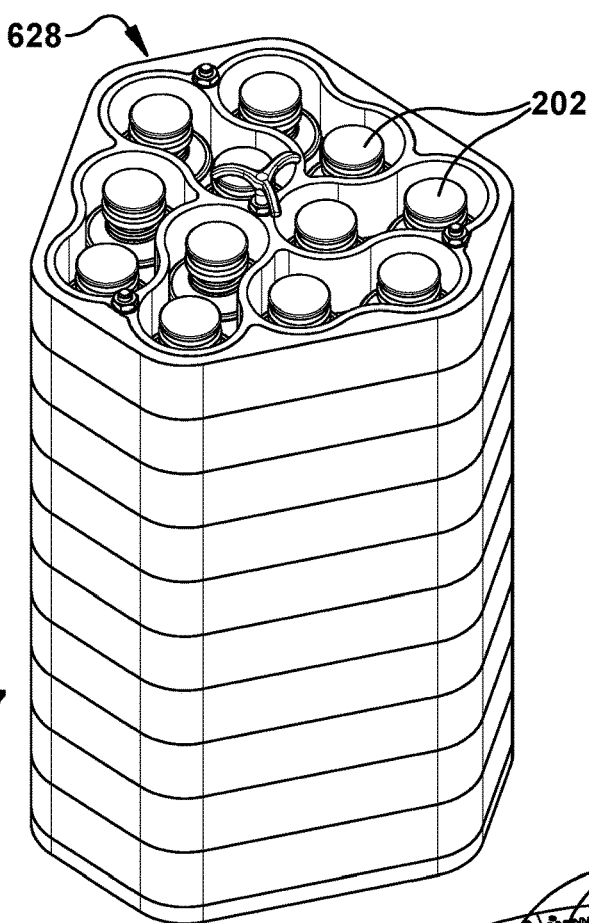
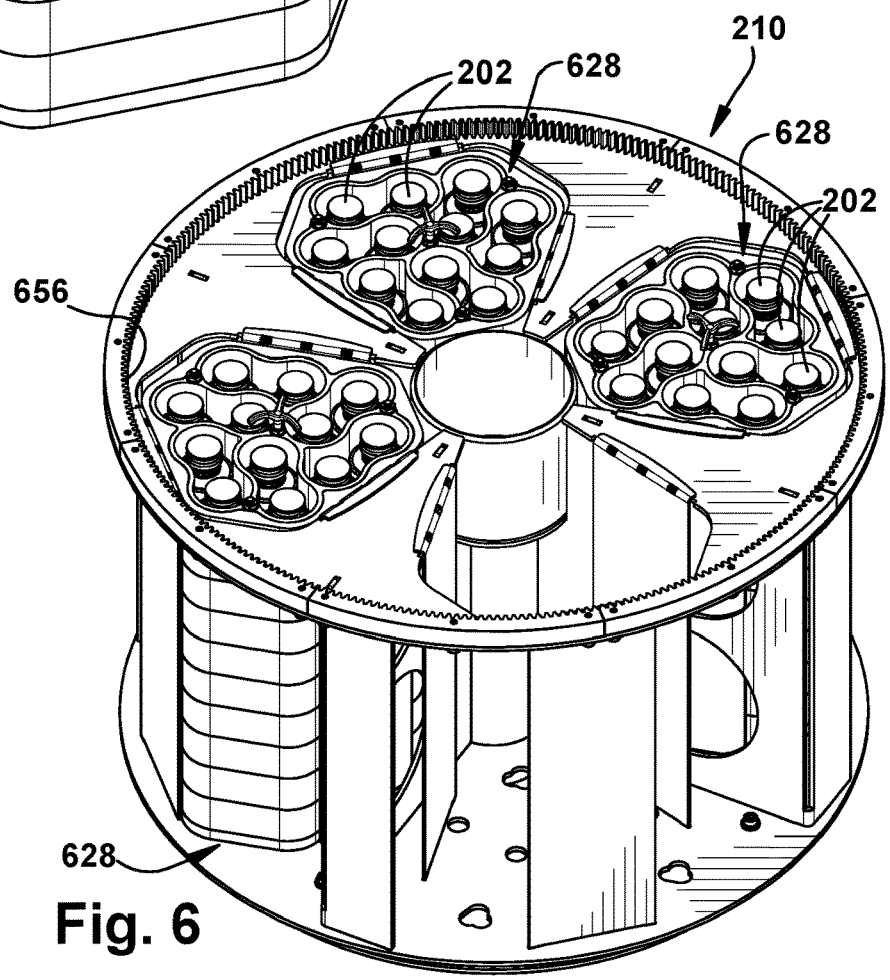

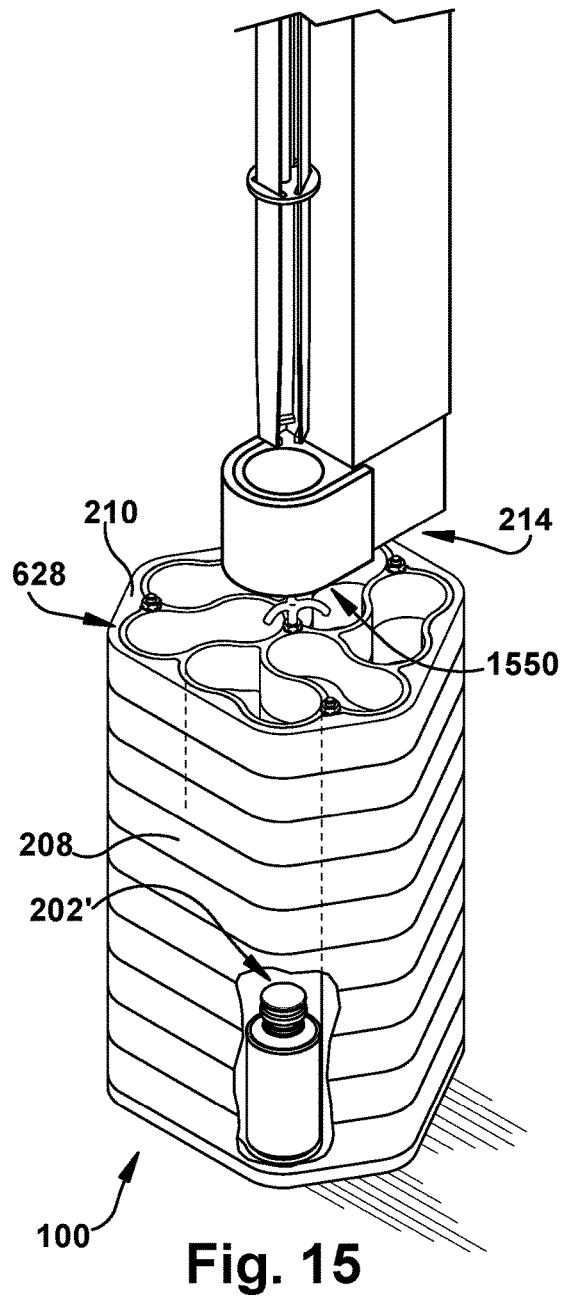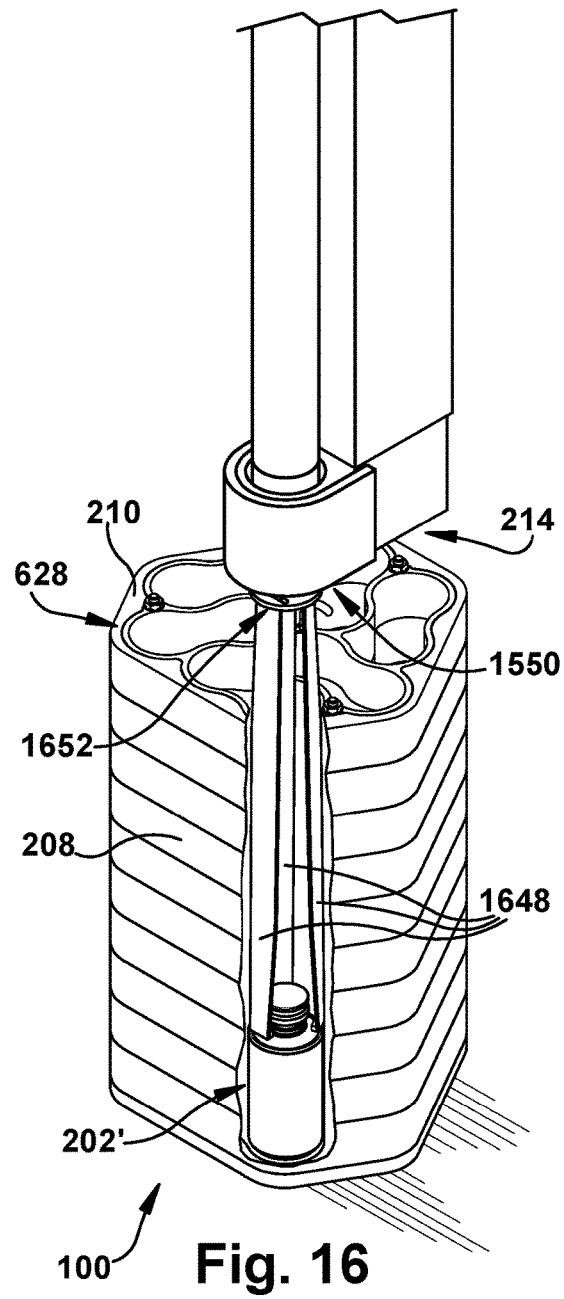

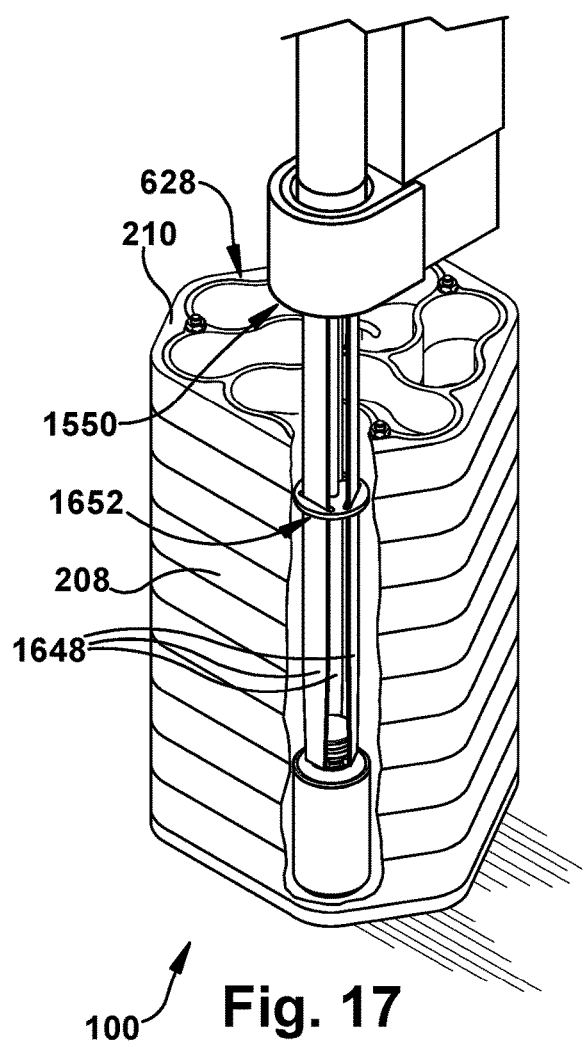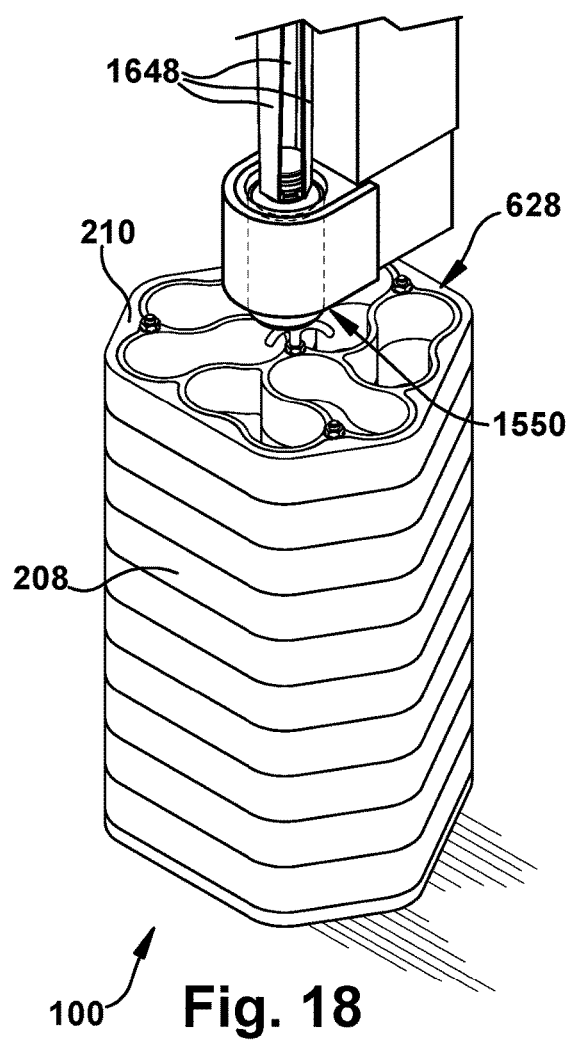

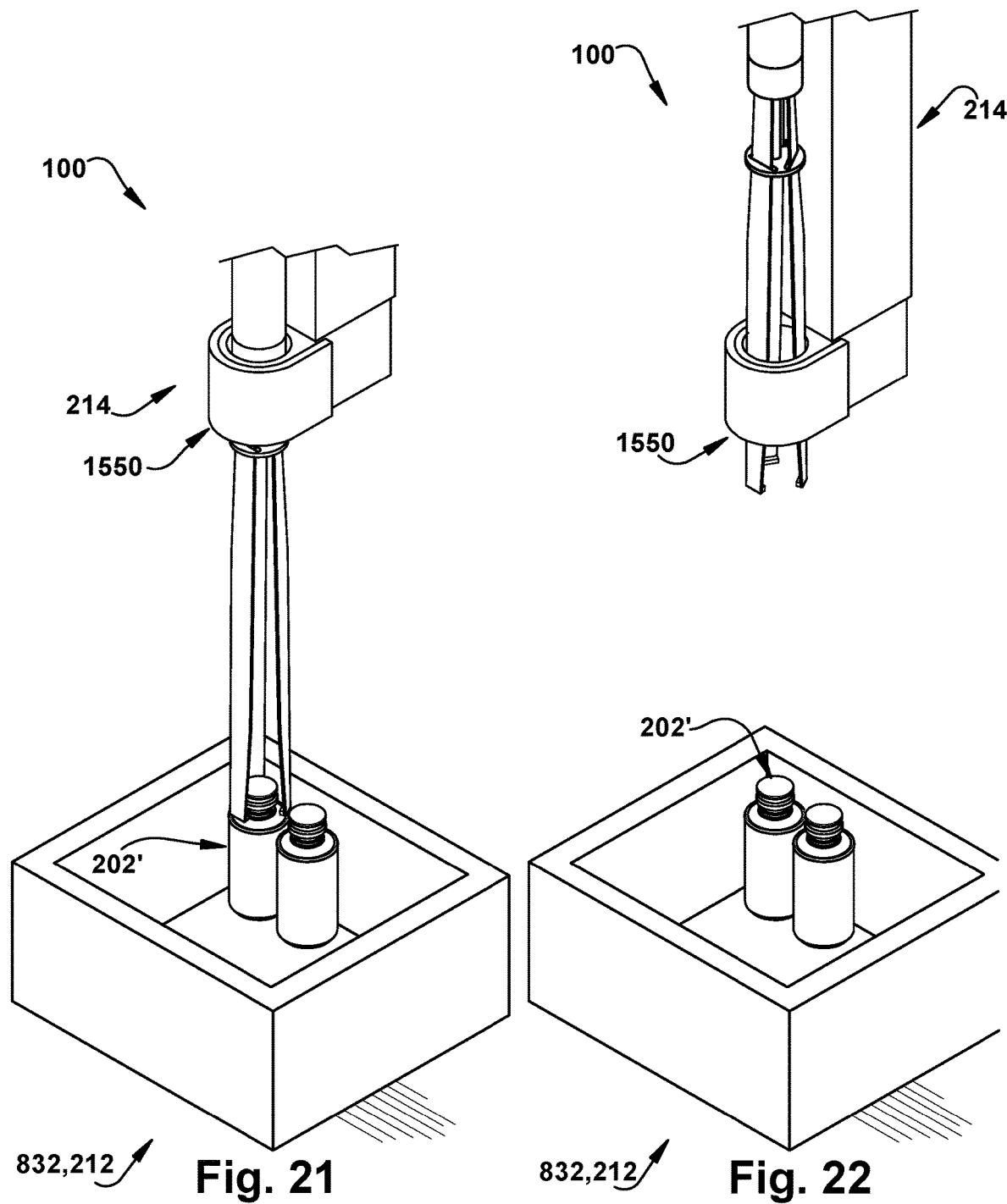

APPARATUS AND METHOD FOR CRYOSTORAGE AND MANIPULATION OF A PLURALITY OF CONTAINER UNITS

RELATED APPLICATION

This application claims priority from U.S. Provisional Application No. 62/846,971, filed 13 May 2019, the subject matter of which is incorporated herein by reference in its entirety.

TECHNICAL FIELD

This disclosure relates to an apparatus and method for cryostorage and manipulation of a plurality of container units and, more particularly, to a method and apparatus of storing and dispensing a substance from an electrically cooled cryosystem.

BACKGROUND

In a medical setting, it is sometimes desirable to securely and cryogenically store substances (e.g., medications or other therapeutics) at extremely low temperatures. For laboratory purposes, liquid nitrogen is often used to achieve appropriate cryogenic temperatures. However, if the cryo-stored substance is a dispensed material for provision, e.g., outside a laboratory setting, it may need to be stored in a pharmacy or storeroom that does not have available liquid nitrogen or cryo-trained personnel. In this case, individual containers of the substance may be provided for single-use dispensing, but access to one container should avoid undesirably warming other stored containers.

In addition, depending upon the nature of the substance, there may be access control and security issues related to the storage and dispensing. For example, the temperature, lot number, expiration date, or other information of a particular container or other unit of the substance may be important to monitor or track. As another example, the substance may need to be dispensed by special permission (e.g., prescription-only), and/or to be tracked for billing purposes. The storage temperature may be monitored and fluctuations detected and addressed.

Finally, it may be desirable, in some use environments, for the substance to be warmed from the cryogenic temperatures before being provided to a user in a controlled manner. For example, for some stored substances, facilitating the transition from frozen to liquid form may be important in maintaining useful value of the substance, which may be rare, fragile, and/or expensive to replace if damaged during thawing. Particularly when the user is not a trained cryo-technician, it may be helpful for the access control procedures to prevent the user from contacting the substance (or a storage structure) which is held at cryogenic temperatures.

SUMMARY

In an aspect, a system for dispensing cryogenically stored materials is described. A cryochamber is electrically cooled at cryogenic temperatures to maintain the stored materials within a first temperature range. The cryochamber includes a cryo-access port. A unit holder is located inside the cryochamber and is configured to hold a plurality of container units. Each container unit contains at least a portion of the stored material. A user interface allows an authenticated user to request a chosen container unit. In response to the request, a warming chamber heats the chosen container unit until thawed condition of the chosen container unit is achieved. A user access area is provided for selectively permitting access to the system, such that the authenticated user can retrieve the chosen container unit which is in the thawed condition, upon providing authentication information to the system. The system provides a notification to the user when the temperature within the thawed condition is achieved.

In an aspect, a method of cryostorage and manipulation of a plurality of container units is described. An apparatus including a cryochamber having an access port, a unit holder located inside the cryochamber, a user access area, and a motive grasper is provided. The cryochamber is electrically cooled at cryogenic temperatures. A plurality of container units are held at the cryogenic temperatures with the unit holder. Responsive to an order by an authenticated user, a chosen container unit is selectively removed from the cryochamber through the cryo-access port with the motive grasper. The chosen container unit is selectively placed into the user access area with the motive grasper. Access by the authenticated user to the chosen container unit is selectively permitted when the chosen container unit is in the user access area.

In an aspect, an apparatus for cryostorage and manipulation of a plurality of container units is described. The apparatus comprises a cryochamber including a cryo-access port. The cryochamber is electrically cooled at cryogenic temperatures. A unit holder is located inside the cryochamber and is configured to hold a plurality of container units. A user access area is provided for selectively permitting access to a chosen container unit by an authenticated user who has been authenticated by the apparatus. A motive grasper is provided for selectively removing the chosen container unit from the cryochamber through the cryo-access port, and selectively placing the chosen container unit into the user access area.

BRIEF DESCRIPTION OF THE DRAWINGS

For a better understanding, reference may be made to the accompanying drawings, in which:

FIG. 6 is a top perspective view of a component of the aspect of FIG. 2;

FIG. 7 is a top perspective view of a component of the aspect of FIG. 2;

FIGS. 15-23 schematically depict an example sequence of operation of the aspect of FIG. 2.

Figure 1:
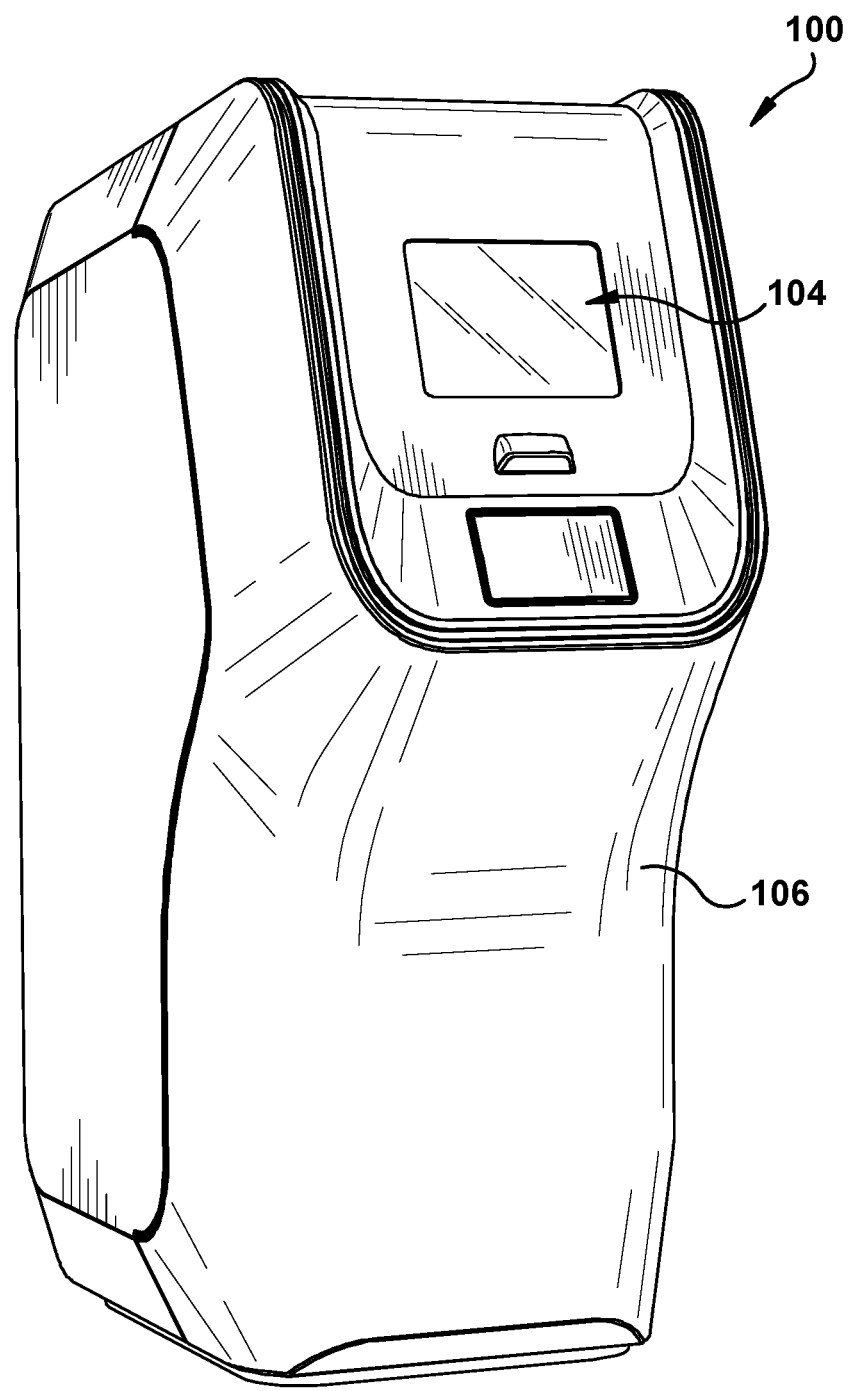
FIG. 1 is a perspective front view of an aspect of the present invention.

This application includes an appendix that forms an integral part of this application. Appendix A provides an example implementation.

DESCRIPTION OF ASPECTS OF THE DISCLOSURE

Unless defined otherwise, all technical and scientific terms used herein have the same meaning as is commonly understood by one of skill in the art to which the present disclosure pertains.

As used herein, the singular forms "a," "an", and "the" can include the plural forms as well, unless the context clearly indicates otherwise. It will be further understood that the terms "comprises" and/or "comprising," as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

As used herein, phrases such as "between X and Y" and "between about X and Y" can be interpreted to include X and Y.

As used herein, phrases such as "from about X to Y" can mean "from about X to about Y."

It will be understood that when an element is referred to as being "on," "attached" to, "connected" to, "coupled" with, "contacting," etc., another element, it can be directly on, attached to, connected to, coupled with, or contacting the other element, or intervening elements may also be present. In contrast, when an element is referred to as being, for example, "directly on," "directly attached" to, "directly connected" to, "directly coupled" with, or "directly contacting" another element, there are no intervening elements present. It will also be appreciated by those of skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under," "below," "lower," "over," "upper", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

As used herein, the term "medical professional" can refer to can refer to any clinician involved in medical care of a patient including, but not limited to, physicians, pharmacists, medical students, nurse practitioners, nurses, and technicians.

The invention comprises, consists of, or consists essentially of the following features, in any combination.

FIG. 1 depicts an apparatus 100 for cryostorage and manipulation of a plurality of container units 202, at least one of which contains a predetermined quantity of a stored material which is desired to be maintained at cryogenic temperatures for a predetermined period of time. An exterior of the apparatus 100 is shown in FIG. 1, with a user interface 104 (shown here as a touchscreen) held by a housing 106. The term "cryogenic" or the prefix "cryo" is used herein to reference a temperature which is below the reach of ordinary vapor-compression refrigeration—for example, below at least a portion of the range at which atmospheric gases (e.g., nitrogen, oxygen, argon, xenon) become liquid at normal pressures (−100° C. to −190° C.). Storage of certain biological materials below about −137° C., for example, may be desired in some use environments. For the sake of discussion, a "cryogenic" temperature is considered herein to be within a range lower than about −125° C. such as, for example, from about −125° C. to about −250° C., or from about −130° C. to about −145° C., or, more specifically, at about −137° C. A "range" can have two bounding values (e.g., from about −125° C. to about −250° C.) or a single explicit bounding value (e.g., below about −125° C., or below about −137° C.). The apparatus 100 can be used in any setting where it is desirable to store material at cryogenic temperatures and selectively dispense the material, optionally warmed from the cryogenic temperatures. However, a pharmaceutical or biopharmaceutical use environment is provided here as an example. The container units 202, therefore, could include one or more vials, bottles, cartridges, boxes, ampules, any other types of holders, and/or any combination of holders, and are configured to carry or contain materials including, but not limited to, medicines, drugs, therapeutic substances, cells, cell therapy based treatments, gene therapy based treatments, gene modified cell therapy based treatments or any other material(s) which are desirably stored at cryogenic temperatures, potentially with access control and monitoring.

Figure 2:
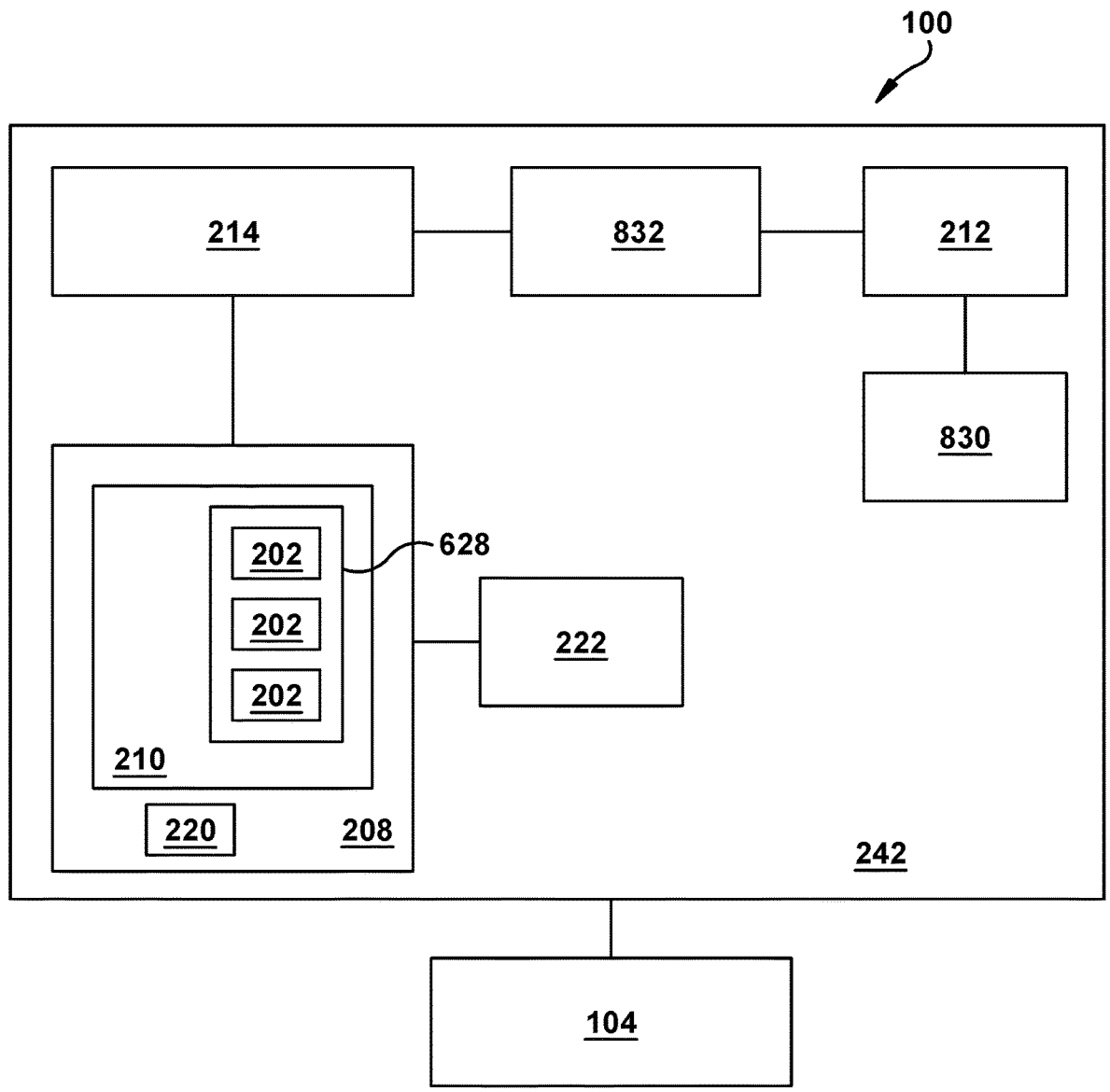
FIG. 2 is a schematic view of the aspect of FIG. 1.

The apparatus 100 according to an aspect of the present technology includes, as shown schematically in FIG. 2, a cryochamber 208 (e.g., a Dewar container), a unit holder 210, a user access area 212, and a motive grasper 214. When present, the housing 106 may substantially enclose the cryochamber 208, unit holder 210, user access area 212, and motive grasper 214, and may selectively prevent user access to at least a portion of an interior of the housing 106. However, it is contemplated that an inventory specialist, maintenance worker, technician, or other authorized person could be permitted access to the interior of the housing 106 for any desired purpose. That is, the user access area 212 may allow access only to a chosen container unit 202', as will be described below. At least the cryochamber 208, as well as optionally the motive grasper 214 and other portions of the apparatus not normally interacting directly with a user accessing the container units 202 for normal use of the contents, may be secured within the housing 106. The housing 106 thus serves to prevent user access, while permitting selected technician access, to the portions of the apparatus 100 which are not intended to be accessed by a user such as a pharmacist or other medical personnel in a facility but where it may be desired to allow a technician to service and/or supply the apparatus 100, again as described below. In this manner, the housing 106 can help to provide tiered access to the interior portion of the apparatus 100 by accessing parties which hold respective levels of authorization, depending upon their relationship to the apparatus 100.

Figure 3:
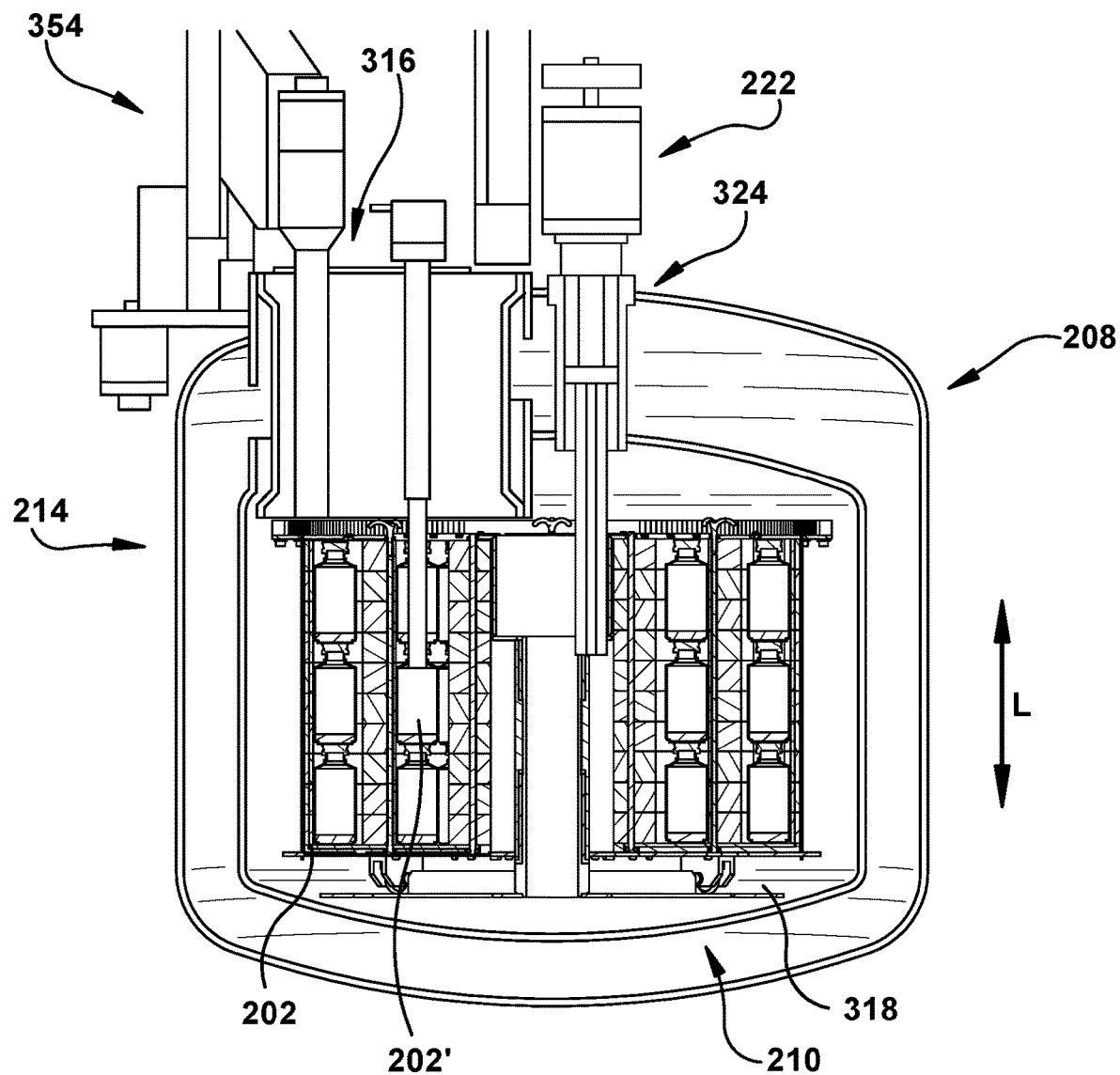
FIG. 3 is a cross-sectional partial view of the aspect of FIG. 2.
Figure 4:
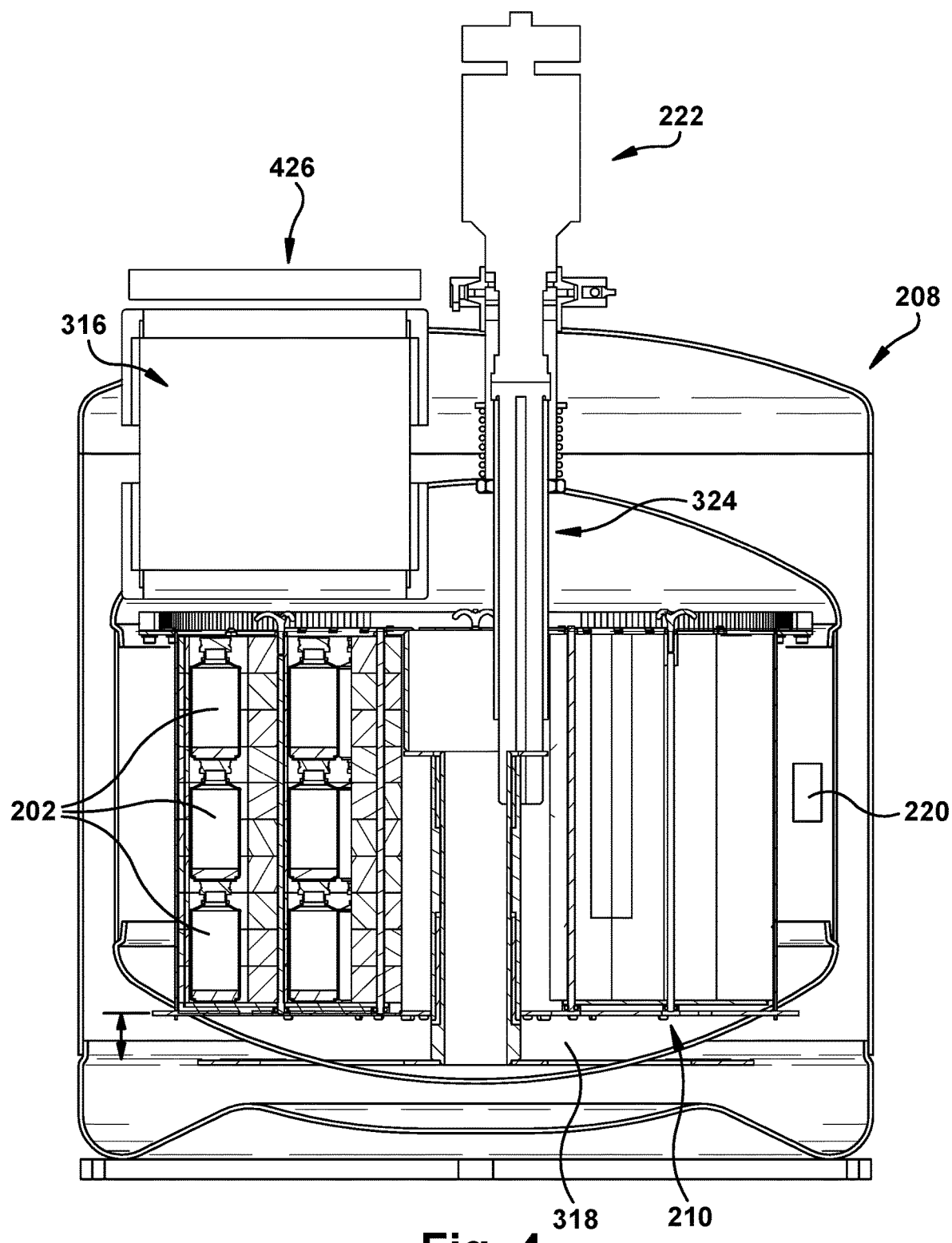
FIG. 4 is a cross-sectional partial view of the aspect of FIG. 2.
Figure 5:
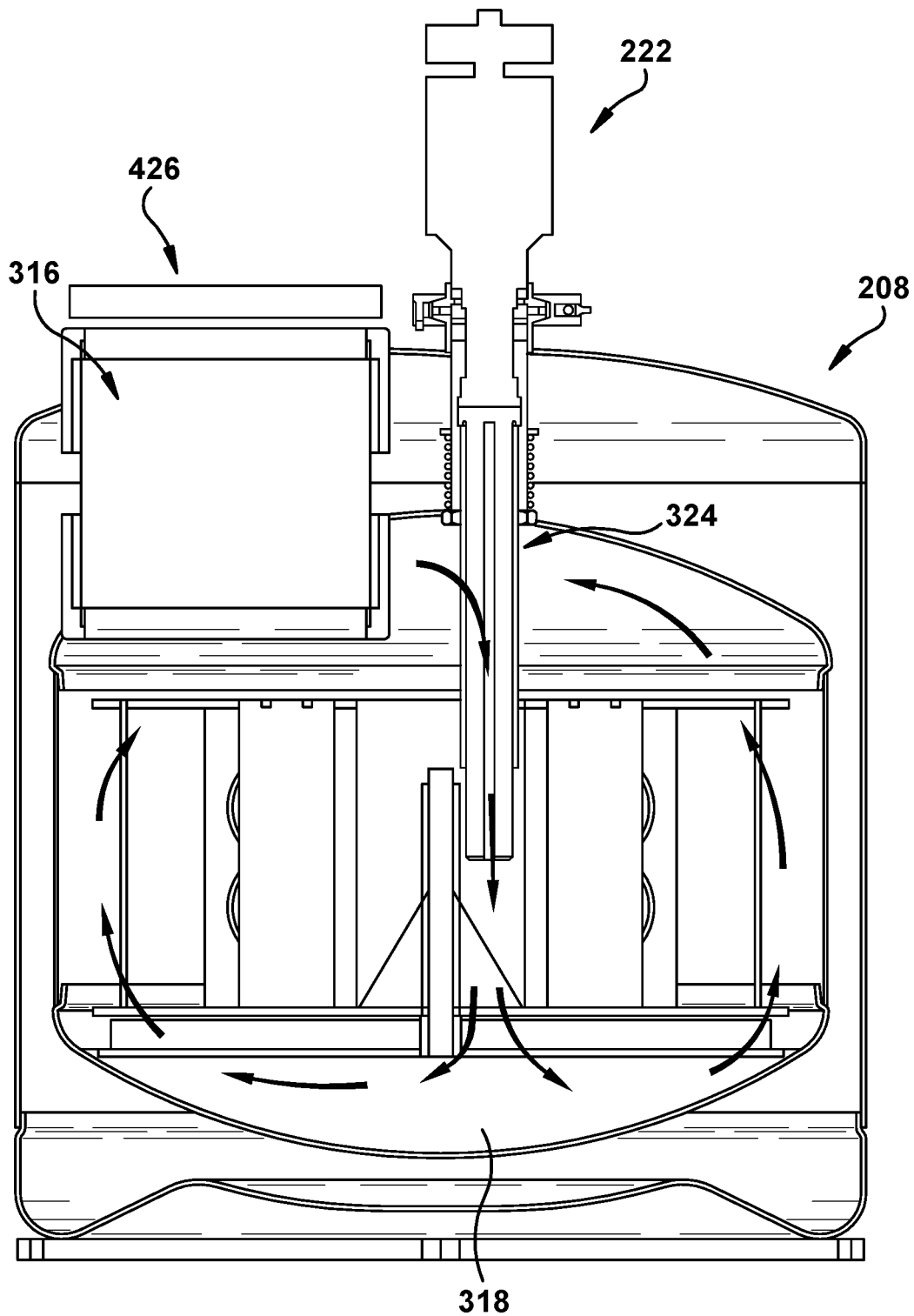
FIG. 5 is a schematic partial view of the aspect of FIG. 2 as depicted in FIG. 4.

With reference to the schematic views of FIGS. 3-5, the cryochamber 208 includes a cryo-access port 316 facilitating physical communication between an interior 318 of the cryochamber and an ambient space. The cryo-access port 316, when present, may be helpful in avoiding or reducing unwanted heat and/or humidity transfer between the interior 318 of the cryochamber 208 and an ambient space. As a result, heat incursion into the cryochamber 208 during selective access of the interior 318 can be minimized. It is also contemplated that an insulated membrane, iris-like overlay, sleeve, sock, glove, boot, "accordion" of skirting (e.g. silicone rubber), or another structure (not shown) could be provided to actively and/or passively reduce heat transfer through the cryo-access port 316, when in use. Structural considerations (resisting the pressure load of atmospheric pressure against a vacuum between the cryochamber's 208 walls, plus supporting the inner vessel), may make it desirable for the cryo-access port 316 to be substantially circular or elliptical, in many use environments.

The cryochamber 208 is electrically cooled at cryogenic temperatures, regardless of how those cryogenic temperatures are originally achieved. For example, the interior 318 of the cryochamber 208 could be held via electrical cooling at an average temperature in a range below about −125° C., such as from about −125° C. to about −250° C., more particularly from about −125° C. to about −200° C., and more particularly from about −140° C. to about −196° C., and more particularly from about −150° C. to about −180° C. (Any desired factor, including but not limited to the material(s) being cryo-stored, power requirements, cooling source type, and/or sensor type may be considered by one of ordinary skill in the art when setting a desired temperature range, including any maximum and/or minimum desired temperature.) At least one temperature sensor (shown schematically at 220 in FIG. 2) may be configured to convey information regarding a temperature within the cryochamber 208 to at least one of a control system of the apparatus and an outside monitor. Through use of the temperature sensor 220 and/or any other suitable features or functions of the apparatus 100, the cryochamber 208 can be held at the desired temperature and can provide any appropriate alerts, preventative steps, remedial actions, or other interventions if it is detected that the temperature of the cryochamber 208 is departing, or has left, an acceptable temperature range.

The interior 318 of the cryochamber 208 is actuated to, and maintained at, cryogenic temperatures for many use environments of the present technology via exclusively electrically powered or electrically generated cooling techniques during normal, steady-state operation, to allow the apparatus 100 to be used in environments that have electrical power but not availability of liquid coolants (e.g., cryofluids). To clarify, the term "electrically cooled" is used herein to indicate a cooling scheme which uses an electrically powered, electromechanical cooling source but does not incorporate any fluid coolant, such as, but not limited to, liquid nitrogen, which is supplied separately from any liquid coolant which may happen to be present as an integral working fluid of the electromechanical cooling source. That is, during normal steady-state operation of the apparatus 100, there is no fluid coolant provided to, and/or operative upon, the cryochamber 208 which is not merely an active working fluid of an electrically powered cooling process.

For example, a cooling source (shown schematically at 222 in FIG. 2) could be a device operating on a thermodynamic cycle (like a Stirling or vapor-compression cycle)—hereafter referenced as a "Stirling engine"; heat pump; heat sink; thermo-electric device; or other electrically powered source of cooling (heat removal from interior 318), which may be powered by an electrical motor or some other electrically-powered source of mechanical energy. An example of a suitable cooling source 222 is a Stirling engine which uses gaseous helium as a working fluid. In this manner, the apparatus 100 could be used in developing nations, pharmacies without liquid coolant capacity, and other use environments merely by supplying electrical power to the apparatus 100. This may be helpful when liquid nitrogen is difficult or expensive to obtain, and/or potentially dangerous to use, in a desired use environment for the materials dispensed by the apparatus 100.

As shown in FIGS. 3-5, an elongate heat exchanger 324 may penetrate longitudinally through at least a portion of the interior 318 of the cryochamber 208. (The term "longitudinal" is used herein to reference a direction substantially parallel to arrow "L" in FIG. 3 and will be the vertical direction for many implementations of the apparatus 100.) This heat exchanger 324 may be of the "cold finger", umbrella, and/or partial disk type(s) or of any other desired active or passive configuration, including sealed heat pipes. As shown in FIG. 5, the heat exchanger 324 extends down into the volume of the interior 318 of the cryochamber 208 and facilitates convective flow of air (represented by arrows) within the cryochamber 208 to reduce thermal stratification of the interior of cryochamber 208 that may otherwise arise in a closed vessel of cold, still air. The convection flow may work to bring air warmed by heat leak into the cryochamber 208 (principally via its outer walls and access port) to the heat exchanger for re-cooling, without need of any mechanical circulator device (like a fan), which may be unreliable in such cold environments. One of ordinary skill in the art can readily provide any desired heat exchangers, cooling sources, or other cooling-related functions and components for the apparatus 100, having any desired type, number, configuration, position, or other properties, to achieve desired results for particular use environment.

For example, heat could flow into the cryochamber 208 by conduction down the interior walls of the cryo-access port 316 and/or by radiation across the vacuum barrier around the chamber. Heat is withdrawn from the cryochamber 208 by the cooling source 222 on its top, by convection from the air within the cryochamber 208 near the elongate heat exchanger 324 (e.g., "coldfinger"), and/or by conduction up that elongate heat exchanger 324 to the cooling source 222 or another cooling engine, which pumps the removed heat to the ambient temperature for rejection to the ambient environment. The removal of heat at the elongate heat exchanger 324 may cause adjacent air to cool, densify, and sink relative to the air near the top of the cryochamber 208, which then flows in toward the elongate heat exchanger 324 to replace that air which fell away. The cooling-driven convection within the cryochamber 208 results in a generally toroidal circulation of air, as is illustrated schematically by the arrows in FIG. 5.

In FIG. 3, the cryochamber 208 is shown with a motive grasper 214 extending down through an open cryo-access port 316 to retrieve a container unit 202. This is an in-use configuration for the motive grasper 214 and cryochamber 208, where the motive grasper 214 is actively retrieving a chosen container unit 202'. For clarity, any time the cryo-access port 316 is open to facilitate a retrieval or placement operation, whether or not a component of the system is located within the cryo-access port 316 at that time, the apparatus 100 is considered to be in an "active retrieval" condition.

FIGS. 4-5, in contrast, schematically show a "storage" configuration, with a cover 426 selectively occluding the cryo-access port 316 and the motive grasper 214 being removed from the cryochamber 208. The cover 426, when present, may assist with maintaining a desired temperature range within the cryochamber 208 when access to the interior 318 of the cryochamber 208 is not needed. While the cover 426 is shown in the Figures as a flat lid, for clarity, it is contemplated that the cover 426 could instead be more of a plug-type, with an insulating solid cylinder extending downward from a flat lid to substantially fill a longitudinal dimension of the cryo-access port 316 and thereby reduce air movement within the cryo-access port 316. The cover 426 can be attached to the cryo-access port 316 in any desired manner, including a threadable connection, frictional- or interference-fit, or simply by virtue of lying in an obstructive position across the cryo-access port 316. Similarly, the cover 426 may be manipulated as desired for selective access of the interior 318 of the cryochamber 208, such as, but not limited to, manually and/or automatically by being motorized and controlled for selective movement into and out of occluding contact with the cryo-access port 316.

Turning now to FIGS. 6-7, the unit holder 210 is located inside the cryochamber 208 and is configured to hold a plurality of container units 202. The plurality of container units 202 may be removably held within the cryochamber 208 in at least one cartridge 628, shown removed from unit holder 210 as FIG. 7. The unit holder 210 in FIG. 6 is of a carousel type arrangement. The circular footprint and center bore of the carousel type unit holder 210 facilitates a relatively small cryo-access port 316 in the cryochamber 208, as will be discussed below.

As can be seen in at least FIGS. 3-4 and 6, when the unit holder 210 is of the carousel type, at least one cartridge 628 may be rotatably mounted within the cryochamber 208 via the carousel 210. The carousel 210 is configured to selectively position the at least one cartridge 628 with a chosen container unit 202', carried by the at least one cartridge 628, in operative alignment with the motive grasper 214. For example, and particularly when an inside profile of the cryo-access port 316 is coordinated with the footprint shape of the cartridge 628, as shown in FIG. 7, the carousel 210 can be rotated or otherwise manipulated to facilitate movement of the cartridge 628 through the cryo-access port 316. The cartridge 628 may be shaped to fit a predetermined number of container units 202 in segments of a circular carousel-type unit holder 210 while still fitting through the cryo-access port 316.

A carousel-type unit holder 210 may be rotated in any desired manner. For example, and as shown in the Figures, an actuator revolver 354 could be inserted into an open cryo-access port 316 (as shown in FIG. 3), before, during, and/or after insertion of the motive grasper 214. The actuator revolver 354 could be used in situations when it is desirable to avoid taking up space within the cryochamber 208 and/or subjecting relatively delicate motion-producing machinery to the cryogenic temperatures within the cryochamber 208, other than as appropriate to move the unit holder 210, during the active retrieval of a chosen container unit 202'. The actuator revolver 354, when present, could interface with a feature of the unit holder 210 (e.g., toothed rim 656, shown in FIG. 6, or merely frictionally or otherwise engage an edge of the unit holder 210) to selectively rotate the unit holder 210 within the cryochamber 208, optionally with the assistance of an axle, gear train, or other structure to assist with alignment and/or smooth movement. One of ordinary skill in the art could readily provide a scheme for rotating or otherwise moving the unit holder 210 for a particular use environment. The actuator revolver 354 shown and described herein, acting through the access port, may assist with reducing or eliminating heat leak from the cryochamber 208 otherwise associated with a permanent internal actuator; gives enhanced angular location precision by use of the very large ring gear (toothed rim 656) rather than a central shaft; and may be integrated with the motive grasper 214 in a single spinning/picking penetrating element, for certain use environments.

Each column of stacked container units 202 may have a known position within the aperture of the cryo-access port 316. A motive grasper 214, seeking to remove a particular one of the container units 202 from the cartridge 628, could be informed (via indexing, sensors, an inventory control algorithm, or in any other desired manner) of which position laterally within the aperture of the cryo-access port 316 the chosen container unit 202' can be found. (The "lateral" direction, as used herein, is substantially perpendicular to the longitudinal direction.)

It is also contemplated that the container units 202 and other structures within the interior 318 of the cryochamber 208 could be relatively static therein, and the cryo-access port 316 could be contemplated to simultaneously permit access to all, or to each column of, container units 202 in a single cartridge 628 that is aligned with the access port 316. As another option, the cryo-access port 316 could be movable with respect to the interior 318 of the cryochamber 208 (e.g., by being itself mounted on a rotatable lid of the cryochamber 208). For many use environments of the apparatus 100 it will be desirable to have the cryo-access port 316 as small as possible to minimize heat transfer from the cryochamber 208, hence the carousel-type arrangement shown in the Figures, which helps to facilitate accessibly storing a large number of container units 202 within the cryochamber 208 and/or to promote access by the motive grasper 214, at different times, to at least a supermajority, or all, of the container units 202 in the cryochamber 208.

After the chosen container unit 202' has been removed from the cartridge 628 by the motive grasper 214, the chosen container unit 202' may be placed in a user access area 212, which selectively permits ambient access to the chosen container unit 202'. The user access area 212 may have any desired configuration. For example, the user access area 212 may include a user access aperture 830 (shown schematically in FIG. 8) configured to selectively allow user to remove the chosen container unit 202' from the apparatus 100. It is contemplated that sensors, interlocks, latches, or any other desired functions or features may be provided to limit user access of the user access area 212 and can be actuated as desired.

For example, the user access aperture 830 could be a hatch or port involving a door which is only unlocked, and/or opened, at a predetermined time when authorized user is permitted to withdraw a chosen container unit 202' therefrom. This permitted-withdrawal time could be predetermined based upon factors including, but not limited to, the passage of time since the chosen container unit 202' was removed from the cryochamber 208, the presentation of an authorization code or other key by the user, the receipt of a remote authorization code from an authorized entity other than the user, a measured temperature of the chosen container unit 202' and/or its contents, and/or any combination thereof. If the user is not authorized, or if there is no suitable chosen container unit 202' in the user access area 212, the user access aperture 830 could be closed and/or locked by a control system of the apparatus 100.

It should be noted that the container units 202 are stored at cryogenic temperatures within the apparatus 100, but, for safety, efficacy, and/or any other reasons, may be desirably dispensed to a user at temperatures significantly above the cryogenic range, such as at room temperature or even warmed above normal ambient room temperatures. Accordingly, a warming chamber (shown schematically at 832 in FIG. 8) may be provided for at least partially thawing the chosen container unit 202' before the chosen container unit 202' enters the user access area 212. For example, the motive grasper 214 could selectively move the chosen container unit 202' from the cryochamber 208 to the warming chamber 832. The warming chamber 832 could then selectively impart heat, which could be electrically generated heat, to the chosen container unit 202'. For example, the warming chamber 832 could include a warming grasper, shown schematically at 834, which selectively physically supports and electrically heats the chosen container unit 202', such as via resistance coils or other heat-applying features in the warming grasper 834 itself. It is contemplated, as well, that waste heat from the cooling source 222 could be used, instead of or in addition to electrical heat, to warm the chosen container unit 202' as desired. It is also contemplated that the motive grasper 214 could itself be configured to provide some warming function, in addition to or instead of the warming chamber 832, as desired. A container unit 202 could itself contain a heating coil or other warming feature, in addition to or instead of a warming feature of the apparatus 100. Warming could be done to a predetermined sensed temperature range (of the chosen container unit 202', ambient space, material within the chosen container unit 202', or any other sensed temperature), for a predetermined period of time, until an ice sensor achieves a predetermined value for ice presence within the chosen container unit 202', or may be controlled in any other desired manner. It is also contemplated that a chosen container unit 202' could be agitated, swished, swirled, or otherwise directly or indirectly manipulated before, during, and/or after the warming process (e.g., via agitating motion of the warming grasper 834) to circulate the material within the chosen container unit 202', in addition to adding heat, in order to more uniformly thaw the material within the chosen container unit 202'.

It is also contemplated that warming could occur directly in the user access area 212, without an intermediate warming chamber 832. In this case, the user access area 212 could be locked to prevent user access until the warming process is complete, as determined via temperature measurement, passage of a predetermined time period, detection of ice presence or in any other way. Whether or not an intermediate warming chamber 832 is provided, at least one of the motive grasper 214 and the warming grasper 834 may be configured to provide heat and/or mechanically agitating motion to the chosen container unit to assist with desired thawing of the contents thereof.

Figure 8:
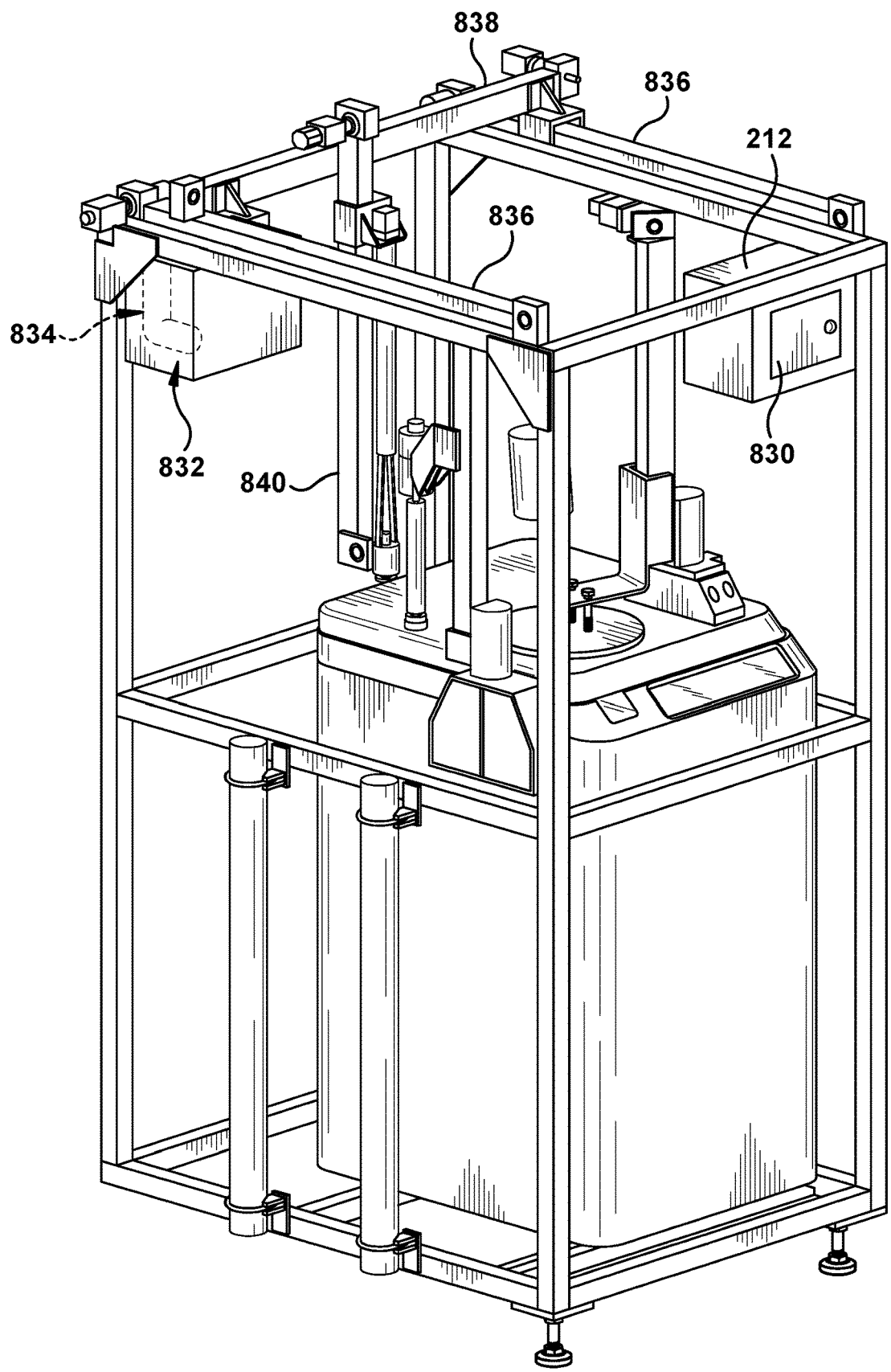
FIG. 8 is a partial side perspective view of the aspect of FIG. 2.

With reference now to FIG. 8, the motive grasper 214 may be used for selectively removing the chosen container unit 202' from the cryochamber 208 through the cryo-access port 316, and selectively place the chosen container unit 202' into the user access area 212, as previously mentioned, optionally with an intermediate stop in a warming chamber 832. As shown in FIG. 8, the motive grasper 214 may be a gantry-style robotic arm, which will have at least 3 degrees of freedom for most use environments of the apparatus 100. That is, the motive grasper 214 could be carried on a fore-aft rail 836 (two shown) and a side-side rail 838 for X-Y motion within the housing 106. An up-down rail 840 could permit motion of the motive grasper 214 in the Z direction within the housing 106. This arrangement will be described in more detail with reference to FIGS. 15-23, below.

It should be understood, however, that the configuration and properties of the motive grasper 214 (indeed, those of any features, structures, components, and/or functions of the apparatus) can be provided by one of ordinary skill in the art for a particular use application. For example, the motive grasper 214 could include features corresponding to one or more of cartesian (e.g., the depicted gantry arrangement), SCARA, cylindrical, delta, polar, vertically articulated, and/or any other suitable robotic scheme. Likewise, the cryochamber 208, cryo-access port 316, user access area 212, warming chamber 832, and/or any other components of the apparatus 100 could be arranged in relation to one another, whether or not a housing 106 is provided, to facilitate the use of a particular motive grasper 214 configuration. For example, when the container units 202 are not rotationally symmetrical, the motive grasper 214 could be wristed to allow rotation of a container unit 202 about a longitudinal axis and thus achieve a desired presentation orientation of the container unit 202 upon arrival at a destination of the motive grasper 214.

As will be discussed in more detail below, the apparatus 100 could include a user interface 104 (e.g., the touchscreen shown in FIG. 1) which is configured to convey information to, and receive inputs from, a user. A control system (shown schematically at 242 in FIG. 2 and described in detail below) would then be configured to actuate at least one of the cryochamber 208, the unit holder 210, the user access area 212, and the motive grasper 214 responsive to the inputs from the user obtained by the user interface 104. The control system 242 could include features related to inventory monitoring and/or control, security of the apparatus 100, operation of the motive grasper 214, cryochamber 208 temperature monitoring and/or control, handling of prescription orders and/or billing requests related to the contents of the container units 202, communication with a remotely located user regarding the contents and condition of the apparatus 100, and/or any other desired features.

It will be appreciated that the control system 242 can be implemented as dedicated hardware, such as an application specific integrated circuit or programmable logic device, as software or firmware instructions implemented via an associated microprocessor, or as a combination of dedicated hardware and software. Further, the control system 242 can be distributed throughout multiple locations within the apparatus and can include both a central controller (not shown) and one or more peripheral controllers providing a local control for specific functions of the device.

The control system 242 can include a network interface to allow for communication with a remote user and logging of information relevant to the operation of the system at a remote server, which can be a cloud server. For example, the network interface can communicate real-time and/or historical information with an outside monitor regarding at least one of cryochamber 208 temperature, apparatus 100 humidity (e.g., humidity of the ambient space at a selected position inside the housing 106), cryochamber 208 operating status, chosen container unit 202' temperature, chosen container unit 202' location, inventory status, access records, and user security data. Further, when the apparatus is operating outside of desired operating parameters or cannot dispense a requested dose, an alarm can be triggered both locally (e.g., as an audible alarm) via the user interface and sent to a remote technician via the control system. In one implementation, information is communicated to the remote server at periodic intervals, and can include any or all of a status, a control temperature, an actual temperature of the cryochamber 208, an ambient temperature measurement, an ambient humidity measurement, a status of the motive grasper 214, a status and temperature of the warming chamber 832, and/or any other desired information.

Further, the network interface can allow a remote or local user having an appropriate level of user privilege to request updates on inventory or monitored parameters. In addition, a remote or local user having administrator privilege can place the apparatus offline or online; edit the user register, time, and/or date; restart the power system, the cooling source 222, the motive grasper 214, a warmer associated with the warming chamber 832, the user interface 104, and/or various inventory control mechanisms (e.g., bar code, RFID, and/or other NFC scanners); and/or change operating parameters, such as controlling temperatures associated with the cryochamber 208 or warming chamber 832. An administrator can also update software at the machine or initiate a software download for later installation, access feeds from internal and external cameras associated with the device, check the system status, access inventory information, including currently queued doses, and access prescriptions provided to the machine, including order and billing information associated with the prescriptions. The present description is agnostic and apathetic about the contents of the container units 202, save the understanding that these are to be stored for a mid- to long-range time frame (e.g., days, weeks, months, or years) under cryogenic temperatures through the use of electrical cooling but without the use of on-site-supplied cryofluids in normal operation. It is contemplated that the container units 202 need not all have the same contents, but could offer the user a variety of materials, as long as all can be appropriately stored in the temperature range selected for the cryochamber 208. For example, when a carousel type unit holder 210 is provided, each cartridge 628, or one or more columns within a cartridge 628, could include different materials.

Figure 9:
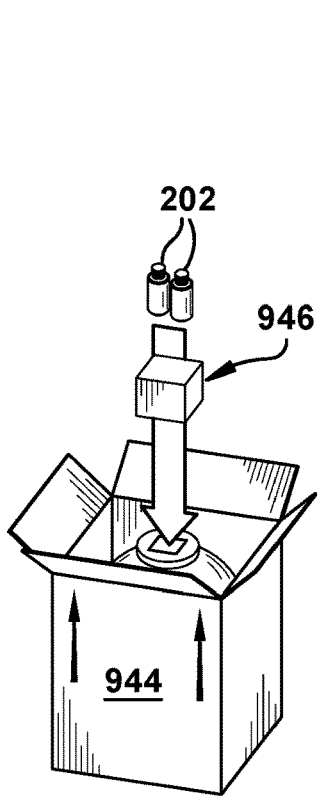
FIGS. 9-11 schematically depict an example sequence of operation of the aspect of FIG. 2.
Figure 10:
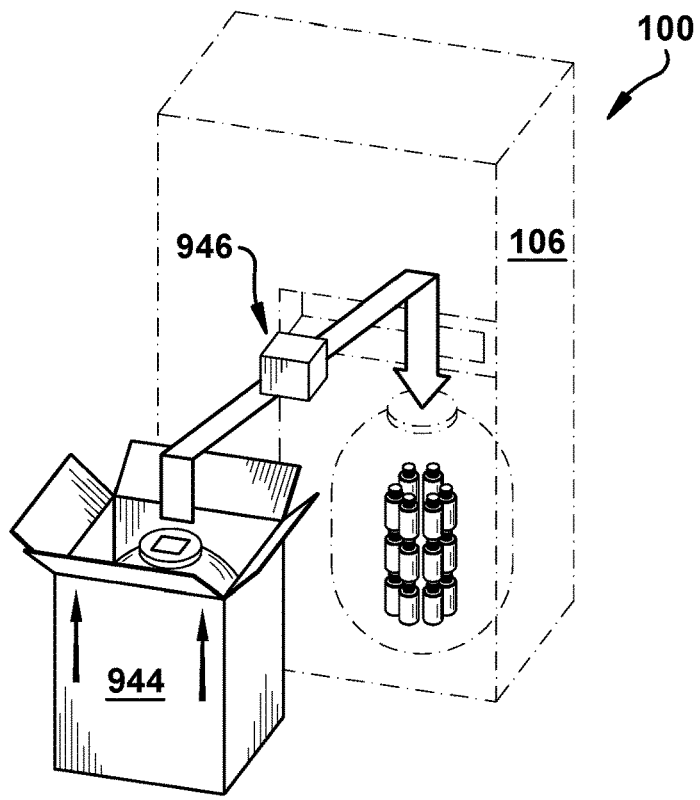

For certain materials provided within the container units 202, it will be desirable for those materials to be controlled by a manufacturer or distributor (basically, someone other than a user or employee of the user site), for inventory, liability, logistics, or any other reasons. In that case, and as shown in FIGS. 9-10, the container units 202 could be transported to the use environment of the apparatus 100 within a drop shipper 944, optionally held within a shipping box 946 or other protective and/or cooling container. This placement is schematically shown in FIG. 9. In FIG. 10, then, the drop shipper 944 has been transported to the location of the apparatus 100. An inventory person (who may be an employee of a manufacturer or distributor rather than of the user site) can remove the container units 202 from the drop shipper 944, and optionally from any other shipping box 946 provided, and can then load the container units 202 into the cryochamber 208. The cartridge 628 itself could be shipped via drop shipper 944, pre-loaded with container units 202 and ready to install. That is, at least one cartridge 628 may be replaceable within the cryochamber 208 by a separately provided replacement cartridge during maintenance of the system. The replacement cartridge could include replenished (i.e., refill) container units 202 compared with the cartridge 628 being replaced, and/or could include at least one different storage material (e.g., a different therapeutic) than the cartridge 628 being replaced. That is, the replacement cartridge could be provided merely to provide additional doses of the same material, or to provide different materials. The cartridge 628 being replaced could have any desired number of container units 202 remaining therein and could be removed for any desired reason including, but not limited to, the type of inventory, the volume of stored material per container unit 202, the age of inventory, the storage conditions (e.g., temperature and/or humidity) within the cryochamber 208 and/or within the housing 106, the absence of inventory (i.e., low/no stock), or any combination of reasons.

In some use environments, it may be desirable for the interior of the housing 106 to be inaccessible to the user, for inventory, liability, logistics, or any other reasons. This supply or loading of the container units 202 and the cryochamber 208 can be accomplished in any suitable manner. For example, a filled cartridge 628 of container units 202 could be provided for slotting into the unit holder 210 in place of another cartridge 628. During the loading process, the container units 202 could be checked in to a particular apparatus, manually by a loading person and/or automatically (e.g., through the use of Radio Frequency Identification "RFID" tags on the container units 202 and a corresponding sensor of the apparatus 100), for any desired reason, such as, but not limited to, inventory control and expiration tracking. The control system 242 will therefore know the position of a particular container unit 202 within the cryochamber 208, for example, as a rotational position of the unit holder 210 and a set of joint angles, rail settings, or other coordinates for the motive grasper 214, or in any other manner, as an input to various operational algorithms. Once the container units 202 have been loaded into the apparatus 100 as desired, they can be dispensed, as represented by FIG. 11.

Figure 11:
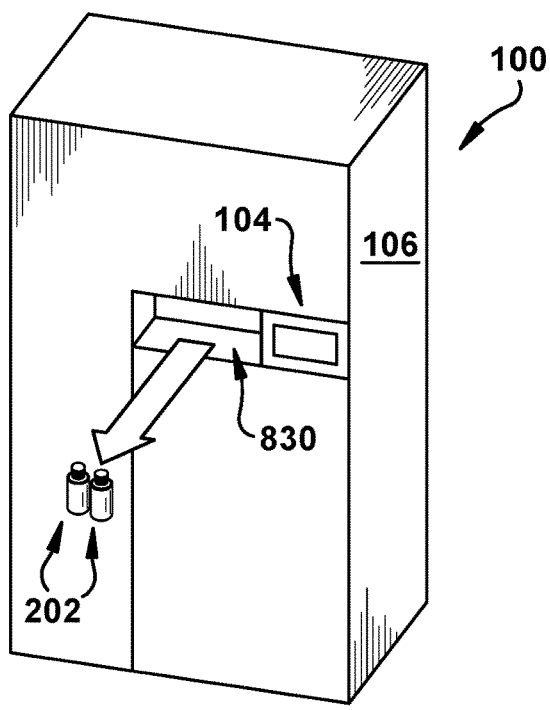
Figure 12:
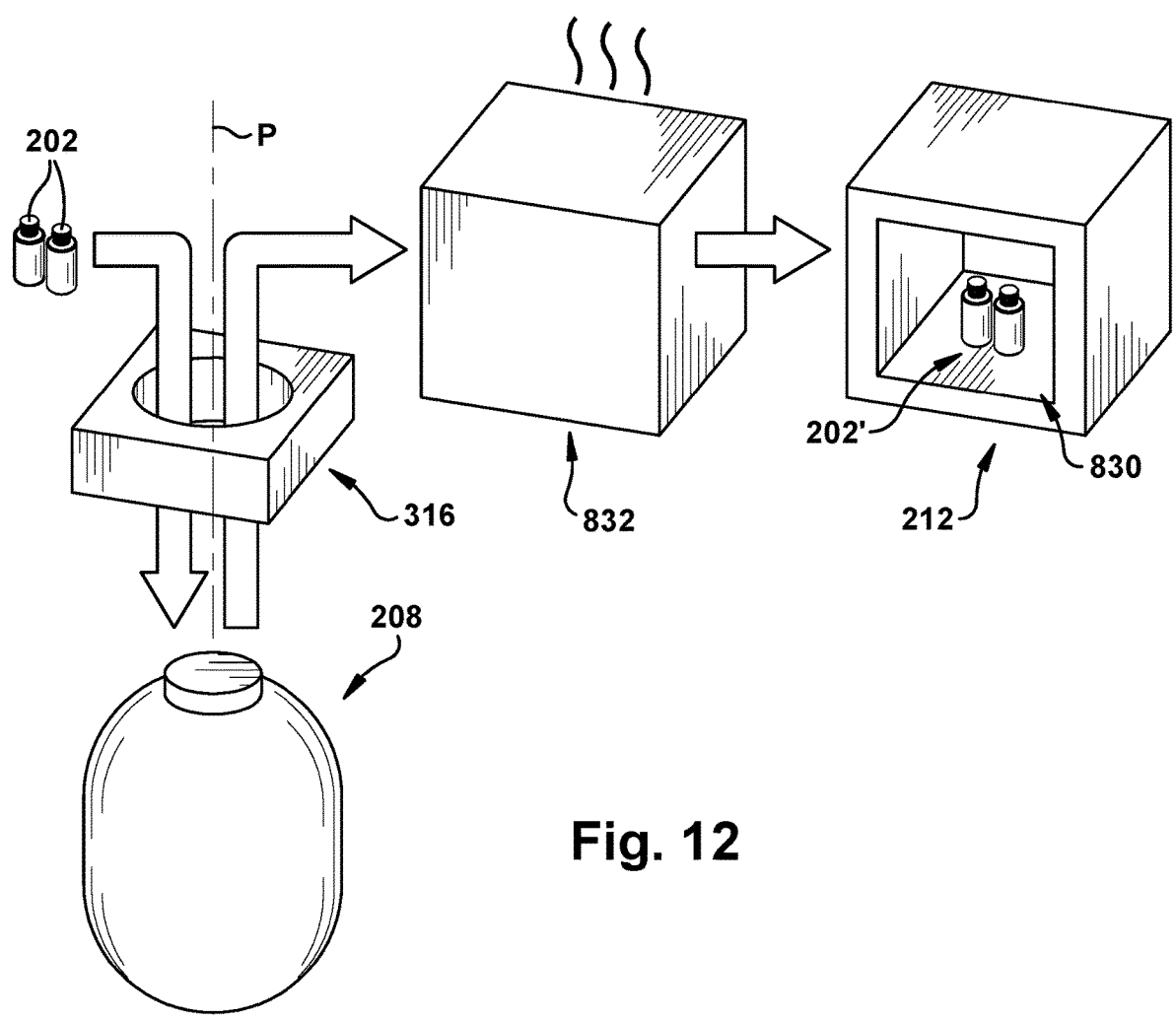
FIG. 12 schematically depicts an example sequence of operation of the aspect of FIG. 2.

FIG. 12 schematically depicts a portion of the sequence of FIGS. 9-11, in a slightly different manner. On the left side of FIG. 12, to the left of dotted line "P", the container units 202 are loaded into the cryochamber 208, by any desired party and in any desired manner. Then, on the right side of dotted line "P" in FIG. 12, one or more chosen container units 202' are removed from the cryochamber 208 and moved to the warming chamber 832, where they are heated as desired. The chosen container units 202' are then moved to the user access area 212, where they can then be removed through the user access aperture 830, as permitted by the programming of the apparatus 100. The movements shown by the arrows in FIG. 12 can be accomplished in any desired manner, but are contemplated to be carried out in most use environments through the use of one or more suitable motive graspers 214.

Figure 13:
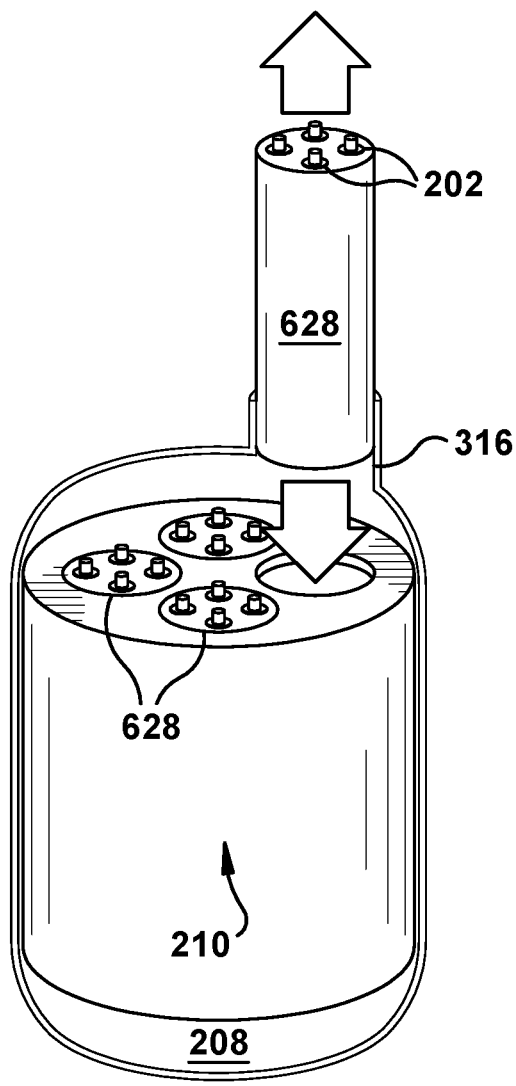
FIGS. 13-14 schematically depict an example sequence of operation of the aspect of FIG. 2.
Figure 14:
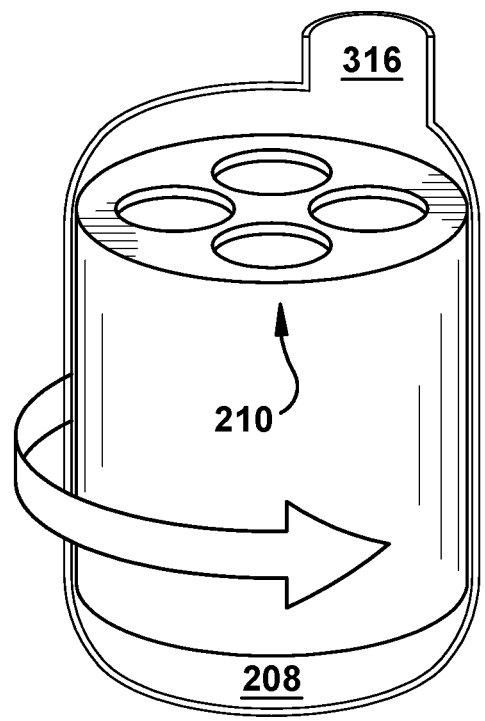

FIG. 13 shows schematically how a cartridge 628, prefilled with container units 202, can be loaded into and removed from the unit holder 210 through the cryo-access port 316. Similarly, FIG. 14 schematically depicts how the unit holder 210 can rotate within the cryochamber 208 to bring a selected position for a cartridge 628 into the vertical alignment with the cryo-access port 316, for loading/unloading of the cartridges 628, access of the chosen container unit 202' by the motive grasper 214, or for any other reason.

FIGS. 15-23 schematically depict the use of the apparatus 100 (represented in benchtop format, without a housing 106) in a method of cryostorage and manipulation of a plurality of container units 202. In these Figures, the motive grasper includes at least one grasping arm 1648 selectively manipulable laterally with respect to a central grasper axis C. The at least one grasping arm 1648 operatively engages a predetermined portion (here, an undercut lip underneath a cap) of the chosen container unit 202' to hold and move the chosen container unit 202'. This process will be described in more detail with reference to the successive FIGS. 15-23.

In FIG. 15, the motive grasper 214 has been moved into operational alignment (here, vertical alignment) with a chosen container unit 202'. The motive grasper 214 shown here includes a container sheath 1550, through which the grasping arms 1648 extend, and into which the chosen container unit 202' is drawn during transport by the motive grasper, to avoid unwanted contact between the chosen container unit 202' and other structures of the apparatus 100. The chosen container unit 202' is shown schematically as being located in a particular position with respect to a cartridge 628, inside the cryochamber 208. An outer wall of the cryochamber 208, and cryo-access port 316, are omitted from FIGS. 15-23, for clarity. The cryochamber 208 may be presumed to have been electrically cooled to, and is being held at via electrical cooling, cryogenic temperatures. A plurality of container units 202 (one shown) are held at the cryogenic temperatures with the unit holder 210, such as being removably held within the cryochamber 208 in at least one cartridge 628. With reference back to FIG. 14, the cartridge 628 can be rotatably mounted within the cryochamber 208 via a carousel type unit holder 210 configuration.

In FIG. 15, the motive grasper 214 is in position for Z-direction motion through the cryo-access port 316 and into lifting engagement with the chosen container unit 202'. A cover 426, when present, is moved aside to an open position to permit access to the interior 318 of the cryochamber 208 via the cryo-access port 316. The motive grasper 214 can then reach down, through the cryo-access port 316, toward the chosen container unit 202', while the cover 426 is open.

Figure 19:
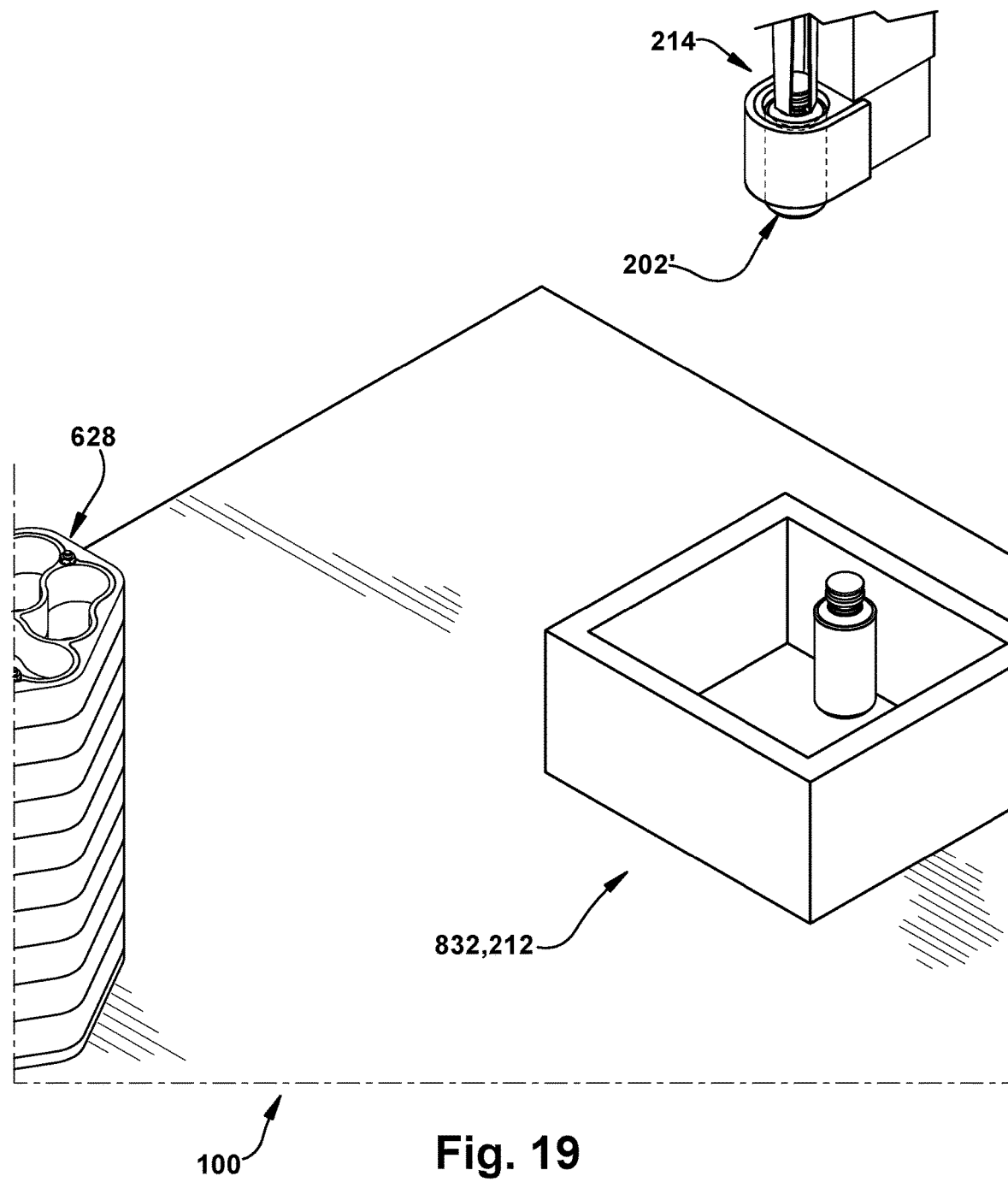
Figure 20:
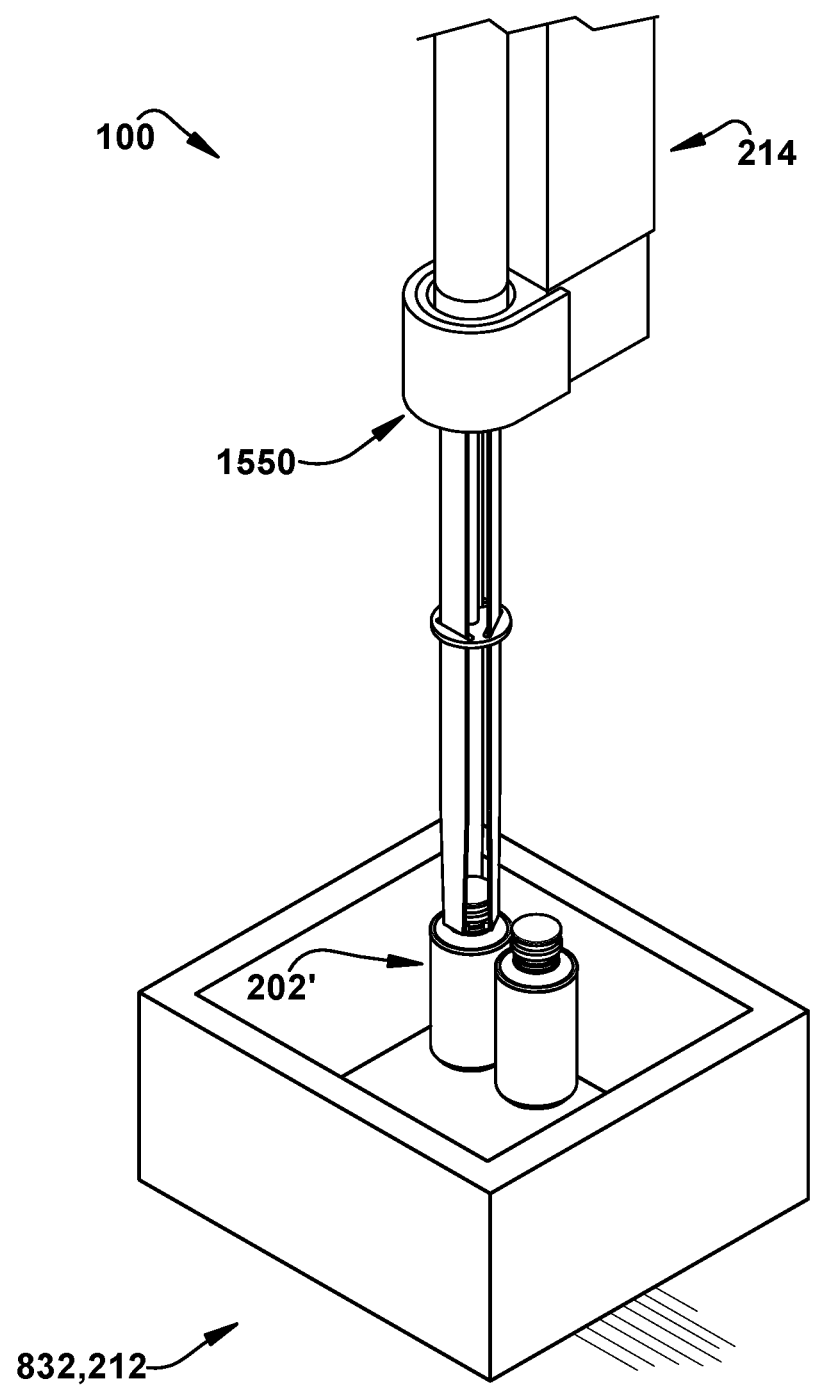
Figure 23:
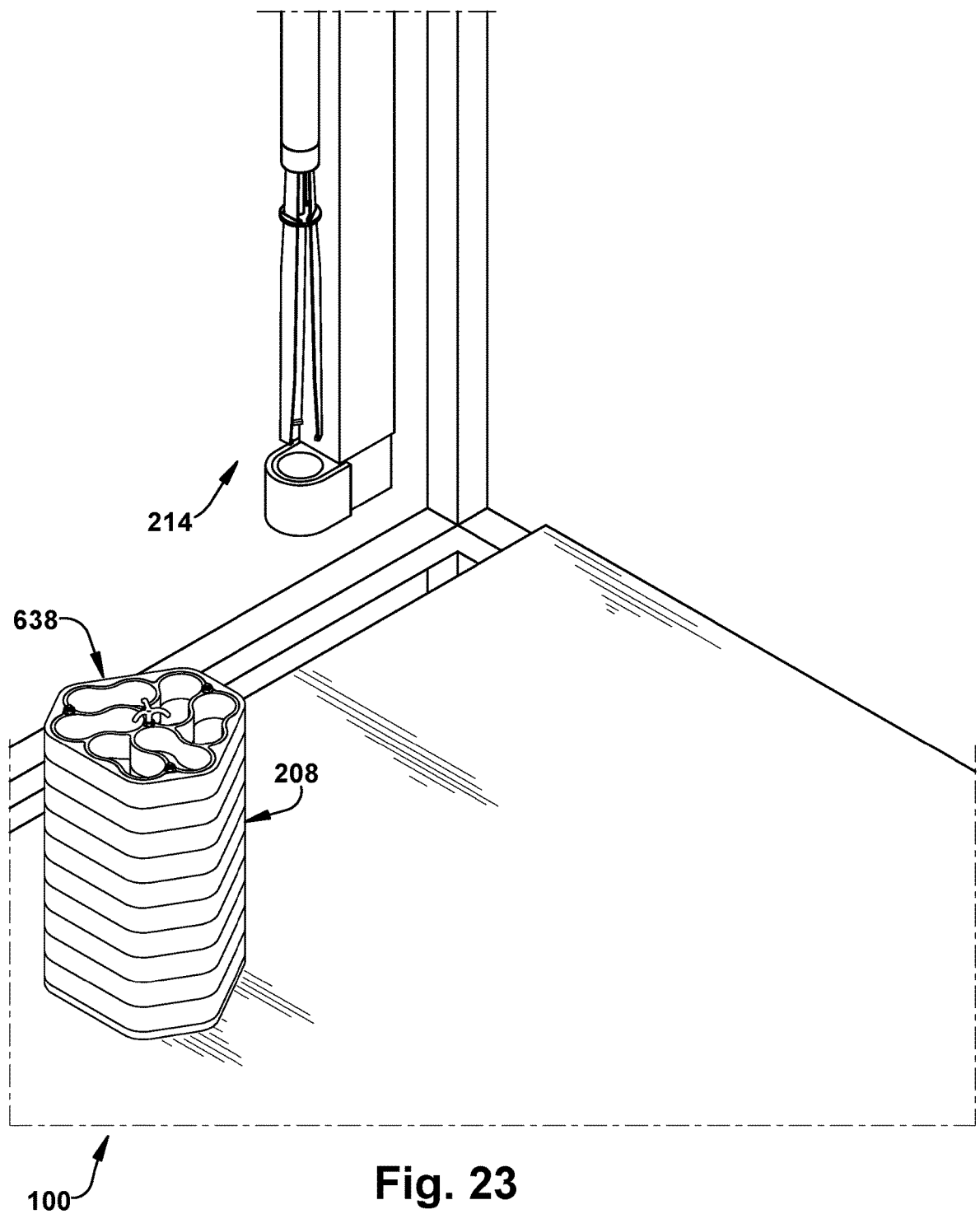

The chosen container unit 202' can then be removed from the cryochamber 208 through the cryo-access port 316 with the motive grasper 214. As shown in the sequence from FIGS. 16-18, this is accomplished with the depicted motive grasper 214 by moving at least one grasping arm 1648 laterally outward from the central grasper axis C to place the motive grasper 214 in an open condition. Here, the grasping arms 1648 each include a ledge at a distalmost portion thereof, extending inward toward the central grasper axis C and configured to catch on an undercut lip underneath a cap of the chosen container unit 202'. The at least one grasping arm 1648 is oriented in lateral alignment with a predetermined portion of the chosen container unit 202' (i.e., the undercut lip, as shown in the Figures). With the at least one grasping arm 1648 laterally aligned with the chosen container unit 202', the at least one grasping arm 1648 is moved laterally inward toward the central grasper axis C into a closed condition to operatively engage the chosen container unit 202'. As is particularly apparent in the sequence from FIG. 16 to FIG. 17, a grasper ring 1652 is moved downward along the grasping arms 1648 to urge them inward toward the central grasper axis C into a closed condition and thus take hold of the chosen container unit 202' in a manner similar to that of a mechanic's claw-end pick-up tool. Again as shown in FIGS. 18-19, the chosen container unit 202' is retracted into a container sheath 1550 for movement.

With the motive grasper 214 in the closed condition and operatively engaged with the chosen container unit 202', the motive grasper 214 is operated to relocate the chosen container unit 202' as desired. For example, the chosen container unit 202' may be pulled up, out of the cryo-access port 316 in the Z-direction and moved in the X-Y plane for selective placement into one or more of the user access area 212 and the warming chamber 832 (both represented by the same noted feature in FIGS. 19-23), as previously discussed. The cover 426, when present, may be moved into the closed position to once again occlude the cryo-access port 316 and prevent unwanted further heat transfer, once the motive grasper 214 no longer requires immediate access to the interior 318 of the cryochamber 208.

In the sequence of FIGS. 19-22, the motive grasper 214 is operated at least partially in reverse of the pick-up motion, to release the chosen container unit 202' to its destination. That is, as shown in the sequence from FIGS. 19-20, the motive grasper 214 is operated to move the chosen container unit 202' downward in the Z-direction and into engagement with the user access area 212 or warming chamber 832, whichever is receiving the chosen container unit 202' at that time. The grasper ring 1652 is then moved upward, in the sequence of FIGS. 20-21, to urge the grasping arms 1648 away from the central grasper axis C (e.g., to release the grasping arms 1648 when they are spring-biased outward from the central grasper axis C). As the grasping arms 1648 move away from the central grasper axis C, they release the chosen container unit 202' at the new location. The grasping arms 1648 are then retracted back upward (e.g., into a "travel" position), and the motive grasper 214 then may move, in the sequence from FIG. 22-23, to a "home" position, which may be spaced apart from any or all of the cryo-access port 316, warming chamber 832, and user access area 212.

The motive grasper 214 will then wait, in that home position or in its last available position, for further commands. For example, the motive grasper 214 (or an additional motive grasper, not shown) could then be used, similarly to the just-described sequence, to move a sufficiently thawed chosen container unit 202' from a warming chamber 832 to a user access area 212, in which ambient access by user to the chosen container unit 202' is selectively permitted, such as through the use of a user access aperture 830.

The grasping motion sequence shown in the Figures and described above uses a claw-type grasping technique. However, one of ordinary skill in the art would be readily able to provide a pick-and-place mechanism capable of handling one or more container units 202 at a time such as, but not limited to, one or more of magnetic connection, piercing with a retractable barb, a lasso-type flexible band (e.g., a frictional or gripping band), pincer claws, and suction devices.

As mentioned earlier, and as will be further described below, a user interface 104 of the apparatus 100 could be used for conveying information to, and receiving inputs from, a user. At least one of the cryochamber 208, the unit holder 210, the user access area 212, and the motive grasper 214 may be responsive to the inputs from the user via a control system 242 of the apparatus 100. For example, a temperature of at least one spatial location within the cryochamber 208 could be measured. Information regarding the measured temperature could then be conveyed to at least one of a control system 242 of the apparatus 100 and an outside monitor. In this way, the cryochamber 208 temperature could be monitored, and steps taken to adjust the temperature once it threatens to exit an allowable range. In one implementation, when the cryochamber temperature deviates from a desired range (e.g., less than about −150° C.), the apparatus 100 can send commands to a controller at the cooling source 222 and/or heat exchanger 324 to increase or decrease a metric associated with the cooling of the cryochamber 208, such as a cooling rate of a Stirling engine. When a correction is performed, some degree of deliberate overcompensation can be performed to move the temperature closer to a midpoint of a desired two-bounding-value range. One of ordinary skill in the art will be able to provide any desirable control system 242, user interface 104, or other components of the apparatus 100 to achieve desired features and operation for a particular use environment.

Figure 24:
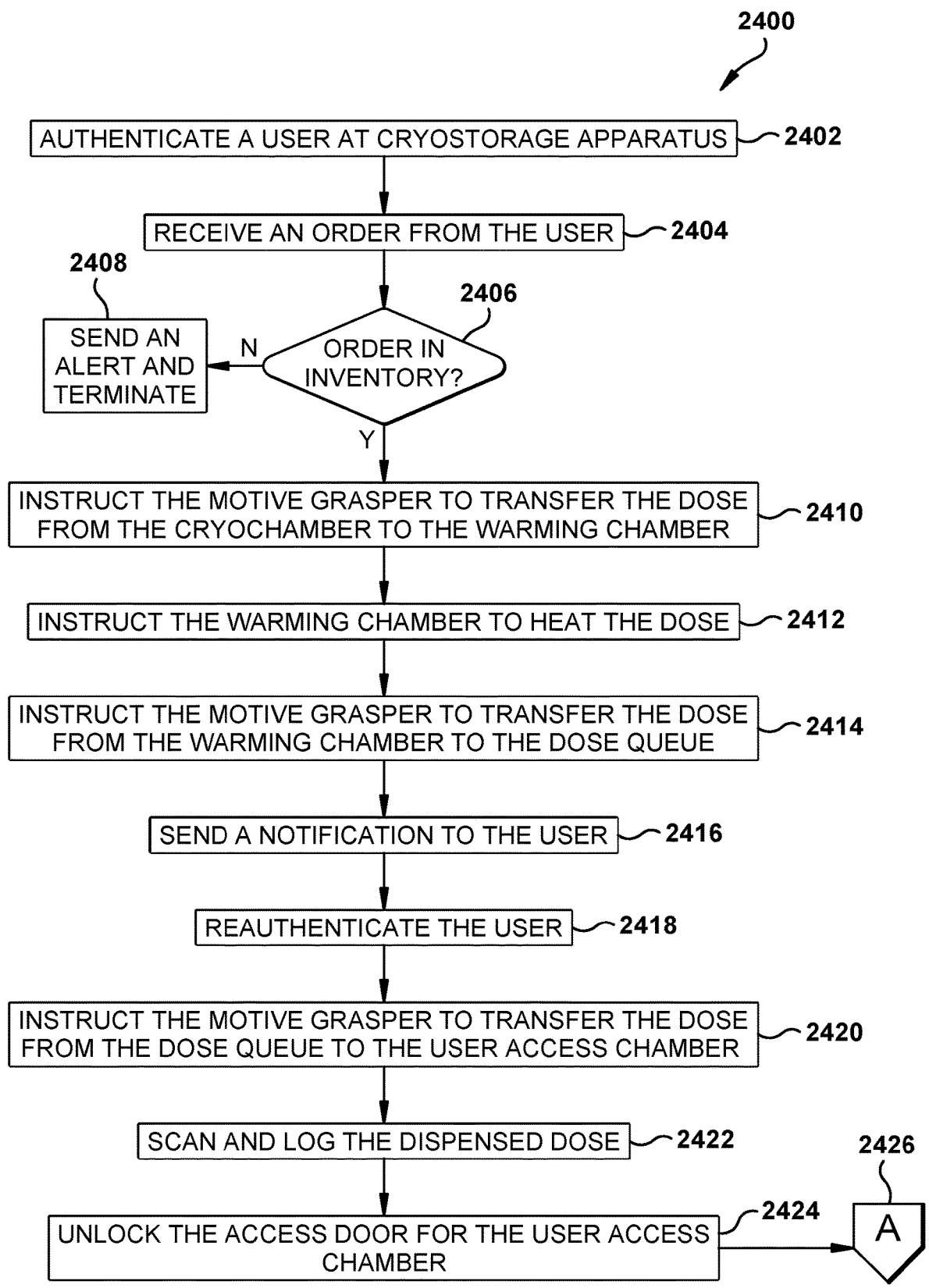
FIGS. 24-26 are flowcharts schematically depicting various sequences of operation of the aspect of FIG. 2.
Figure 25:
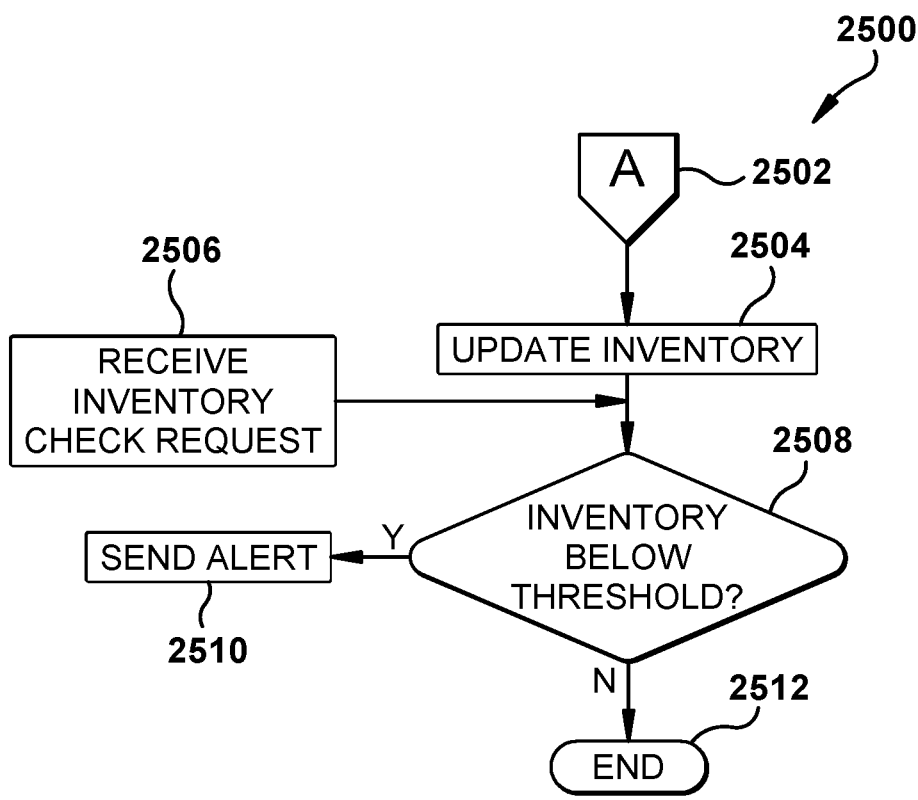
Figure 26:
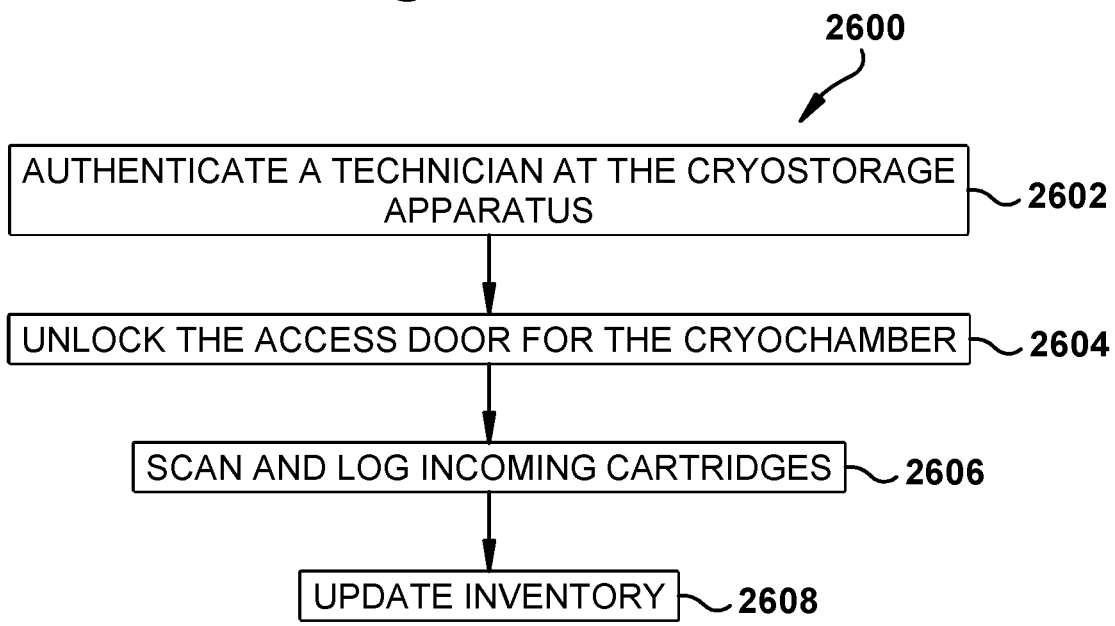

In view of the foregoing structural and functional features described above, a method in accordance with various aspects of the present invention will be better appreciated with reference to FIGS. 24-26. While, for purposes of simplicity of explanation, the methods of FIGS. 24-26 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 24 illustrates a method 2400 for dispensing a dose from the cryostorage assembly to a user. The method 2400 begins at 2402 where a user is authenticated at the apparatus 100. In this scenario, the user will generally be a medical professional associated with a location at which the apparatus 100 is installed. It will be appreciated, however, that the system can have multiple levels of access, with varying levels of user privileges. For example, a first level of user access, as might be appropriate for a medical professional, might require authentication at the physical device and allow access only to an order submission menu at the user interface 104 and to the user access area 212, whereas a second level of user access might allow remote authorization and access to data logged at the apparatus 100 and/or to areas of the interior of the housing 106 other than just the user access area 212. For example, an enhanced level of user access can be required to allow access to the unit holder 210 for loading and unloading of doses. Similarly, an enhanced level of user access can allow access to a system status, inventory data, order information, including prescription and billing data, for doses dispensed at the cryostorage assembly.

In one example, a user can input an identifier, such as a username or identification number, along with a password at the user interface 104. The password can be hashed and compared to either a locally stored password hash or a password hash stored on a related server to authenticate the user. Additionally or alternatively, the apparatus 100 can include one or more biometric authentication devices, including any of a camera with one of facial recognition software, retinal recognition software, or iris recognition software; a microphone with appropriate voice identification software; a fingerprint scanner; and an infrared source and camera with appropriate vascular recognition software. In addition to or in alternative to password and/or biometric authentication, an interrogation sensor (e.g., an RFID scanner or short-range communication transceiver) can be used, in combination with a device or token carried by the user to verify the identity of the user.

At 2404, an order is received from the user via the user interface 104. For example, a menu can be displayed to the authorized user to enter appropriate information for requesting a dose of therapeutics or other material associated with the container units 202, which can include, for example, prescription information, an identity of the therapeutic, and a quantity of doses required. The prescription order data could also or instead be provided remotely and/or read with an integrated scanner, even if the order is not in a human-readable format. (The term "dose", in the description of FIGS. 24-26, should be considered to be analogous to material carried by one or more of the otherwise referenced container unit 202, as appropriate.) At 2406, it is determined if the apparatus 100 contains sufficient inventory to fulfill the requested dose. If not (N), an alert is sent to a technician at 2408 and the method terminates. If sufficient inventory is available (Y), the method advances to 2410.

At 2410, the motive grasper 214 is instructed by the control system 242 to transfer the requested dose from a location in the cryochamber 208 and transfer it to the warming chamber 832. This may be done, for example, via coordinating some combination of opening/closing of a cover 426, movement of the motive grasper 214, and/or rotation of the unit holder 210 (which could include inserting the actuator revolver 354 into the cryochamber 208 before, during, and/or after insertion of the motive grasper 214). It will be appreciated that the specific source location in the cryochamber 208 can be determined when the inventory is checked at 2406. At 2412, the warming chamber 832 is instructed to heat the dose to a therapeutically useful temperature. Each of a heat source and an agitator associated with a warming chamber 832 can be controlled by the control system 242 based on feedback from any desired type of sensors (temperature, time, ice/solid/liquid) within the warming chamber 832 to bring the dose to thawed condition. (One of ordinary skill in the art will recognize that the ice/liquid transition could occur even at relatively low temperatures, and provide a suitable definition and detection of a "thawed condition" for a particular use environment accordingly.) This thawed condition may be determined responsive to the chosen container unit 202' or any other component of the apparatus 100 achieving a temperature within a desired range (e.g., a "second" or thawed temperature range, in contrast with a "first" temperature range within which the cryochamber 208 is held), the passage of a predetermined period of time, the detection of a predetermined amount of liquid and/or ice within the chosen container unit 202', or in any other manner. A chosen container unit 202' which is considered to be in a thawed condition might include some remaining frozen material, in certain use environments. In one implementation, temperature sensors are located within heating pads that are positioned in close proximity to the dose to be heated, and a peripheral controller dedicated to the warming chamber 832 can regulate the output at the heating pads to bring the dose within a desired temperature range. In one implementation, the desired temperature range is between zero and thirty-seven degrees Celsius, although it will be appreciated that the temperature range can vary with the specific therapeutic. Any appropriate sensors, including temperature, icing (e.g., solid/liquid), and/or elapsed-time sensors, can be provided to monitor thawing of the dose to the thawed condition. (For example, temperature of the dose could be monitored to reach at least any minimum value of the second temperature range while not exceeding any maximum value of the second temperature range.) It is also contemplated that, for certain use environments, the chosen container unit 202' may be heated beyond a mere thawed condition and presented to the user at a temperature at or even over the ambient temperature, as desired.

Similarly, at least one humidity sensor (which could be co-located with the temperature sensor(s) within the cryochamber 208, also at 220 as shown schematically in FIG. 2) may be configured to convey information regarding a humidity level within the cryochamber 208 to at least one of a control system of the apparatus 100 and an outside monitor, such that a system control receives an output of the humidity sensor and controls a metric associated with the cryochamber 208 (e.g, by running a dehumidifier, not shown) to maintain a humidity of the cryochamber 208 within a predetermined humidity range. It is also contemplated that the humidity sensor could be located within the housing 106 but outside the cryochamber 208, to facilitate monitoring and/or control of humidity at near-ambient areas of the apparatus 100, since that apparatus humidity could enter the cryochamber 208 in an unwanted manner.

At 2414, the motive grasper 214 is instructed by the control system 242 to transfer the requested dose from the warming chamber 832 and transfer it to a holding area, referred to herein as the dose queue. It is contemplated that the dose queue transfer could be done virtually—for example, when the warming chamber 832 also serves as the user access area 212. A notification is then sent to the user at 2416, for example, via a SMS or e-mail message, visual or audio signal for remote or proximate perception, or in any other desired manner, to notify the user that the dose is ready for retrieval. At 2418, the user is reauthenticated, in a manner similar to that described above at 2402, to allow access to the user access area 212. Once the user is authenticated, the motive grasper 214 is instructed by the control system 242 to transfer the requested dose from the dose queue to the user access area 212, either directly or via secondary transport device, as needed (for example, when the dose queue is located remotely from the user access area 212). At 2422, as part of the transition of the dose to the user access area 212, the dose can be scanned, for example, at a bar code reader or via an RFID transceiver, to verify the identity of the dispensed dose, and this information can be logged at the apparatus. As part of the logging process, the control system 242 can log the identity of the individual retrieving the dose, as well as an entity for whom the individual is retrieving the dose (e.g., a pharmacy by whom the individual is employed).

At 2424, an access door for the user access area 212 can be selectively unlocked to allow access to the authenticated user through the user access aperture 830. In one example, the door is opened for the user via a mechanical actuator. In another example, an interlock holding the door closed is temporarily disabled to allow the dose to be retrieved. Once the dose is retrieved, the interlock holding the door closed can be restored, and, in some examples, one or both of an invoice for the cost of the dispensed dose and documentation, such as a receipt, certifying a change in ownership of the dispensed dose can be generated. The inventory management process illustrated in FIG. 25 is then initiated at 2426.

FIG. 25 illustrates an example of a method 2500 for maintaining an inventory at a cryostorage apparatus 100. At 2502, data concerning a recently dispensed dose is received at a controller, and the inventory is updated at 2504 to indicate that the dose has been removed. Any removal of a dose triggers a check to see if it is necessary to replenish inventory, although this check can also be triggered by a request from an administrator or a technician, as shown at 2506. It will be appreciated that the request at 2506 can be performed via the user interface 104 or via a remote request via a network interface.

At 2508, the inventory database is accessed to determine if the inventory level at the cryostorage apparatus 100 is below a threshold level. Where doses of multiple types are stored at the apparatus 100, the inventory for each type of dose can be checked independently. If the inventory for any product is below a threshold level (Y), an alert can be provided to a technician at 2510 to provide replacement inventory. If the inventory is not below the threshold level (N), the method terminates at 2512.

FIG. 26 illustrates a method 2600 for replenishing inventory at the cryostorage apparatus 100. At 2602, a technician is authenticated at the apparatus 100. This is performed similarly to the process at 2402, although given the enhanced access allowed for the technician, as compared to a medical professional user, multiple means of authentication may be required. At 2604, an access door (not shown) in the housing 106 is unlocked to allow the technician to load doses (e.g., material contained within container units 202) into the inventory chamber (the cryochamber 208), either individually or in any desired type of multi-unit transfer and/or holding structure such as, but not limited to, a cartridge 628 (which will be presumed to be in use here). At 2606, each cartridge 628 is scanned, for example, at a bar code reader or via an RFID transceiver, to identify the inventory added to the machine. An inventory database is updated at 2608 to reflect the newly added inventory.

Although the apparatus is described as using cartridges 628, it is contemplated that other devices for feeding additional inventory into the apparatus may be utilized, including via the user access aperture 830, in a reversal of the dispensing process (though without the warming step). Further, while bar codes and RFID readers are mentioned for inventory control, it will be appreciated that other methods, such as a camera utilizing appropriate optical character recognition, OR code reader, or pattern recognition classifier, can be used to determine the inventory inserted into or removed from the apparatus. Further, the list of authentication methods described herein is non-exhaustive, and other methods could be used for verifying the identity and privilege level of users.

It is contemplated that the apparatus 100 could include any number or type(s) of sensors (temperature, position, inertia, RFID, pressure, humidity, light sensor to detect tampering, etc.) and/or controllers (of any component or function of the apparatus 100) which can be configured and employed as appropriate to carry out tasks described and mentioned herein, as well as any other ancillary, related, or similar tasks, as desired by one of ordinary skill in the art. Redundancies, multiple sensors, and/or logic circuits could also be used for any desired monitoring and/or control purpose—for example, to compare multiple temperature inputs (from the same or different areas of the apparatus 100) and decide which to use in driving the system.

Although the apparatus 100 is shown and described herein as being exclusively electrically cooled via electrical power to an electromechanical cooling device, it is also contemplated that another coolant, such as, but not limited to, liquid nitrogen, could be provided on a short-term (e.g., emergency power outage or other not-normal operation) or ongoing (e.g., failure of the cooling source 222) basis to supplement or replace the electrical cooling of the cryochamber 208 as desired. For example, it is contemplated that electrical cooling could be supplemented or supplanted at times with liquid nitrogen or another fluid coolant by the technician for initial cooling; during inventory transfer; and/or during an emergency. This may be done by simply pouring the fluid coolant into the cryochamber 208 or in any other desired manner, which may be, for example, an efficient and effective way to initially bring the cryochamber 208 down to a desired temperature range during startup, which range the electrical cooling can then maintain in steady-state operation. However, due to the normal use environment for the apparatus 100 not being expected to maintain a steady supply of cryofluid coolant, the apparatus 100 is herein presumed to be electrically cooled absent rare and short-term special circumstances that will normally be promptly corrected and return the apparatus 100 to electrical cooling. It is also contemplated that the electrical power used for the apparatus 100 could be sourced from mains power, a standalone generator, a battery backup system, a generator integrated into the apparatus, or in any other suitable manner.

It is also contemplated that the apparatus 100 could be selectively used to accept and then cryogenically store container units 202 provided to it by a user (e.g., lab samples for later access). In this case, one of ordinary skill in the art could readily use the description of the apparatus 100 herein to generate a reverse operation scheme by which two-way communication with the user could be achieved by the apparatus 100.

In some use environments, it may be desirable to dispense more than one chosen container unit(s) 202' within an abbreviated timeframe—for example, when two or more container units 202 comprise a desired dose, or when multiple doses are desired with overlapping cycle times. To that end, it is contemplated that multiple warming chambers 832 (or just the warming graspers 834) and/or user access areas 212 (or just the user access apertures 830) may be provided. In this manner, multiple chosen container units 202' could be in different stages of the warming process simultaneously, corresponding to orders for dispensing material which are placed closely in time. The apparatus 100 could include first-come, first-served logic which dispenses a ready chosen container unit 202' to the first user to respond when a series of ready alerts are set. Conversely, each chosen container unit 202' could be reserved for a particular user, and an earlier-arriving user would not be able to access that reserved chosen container unit 202'; this might be particularly desirable when different materials are provided in different container units 202.

The apparatus 100 could also include a waste area (which could be, for example, a designated do not use portion or position within the unit holder 210), permitting a container unit 202 to be set aside when that particular container unit should not be dispensed to a user, for some reason. For example, if that container unit 202 is expired, is lighter than expected (which would indicate a missed fill), sat too long in the user access area 212 without being picked up, or has any other defect.

In summary, a person having ordinary skill in the art will understand that an example aspect 1 includes an apparatus for cryostorage and manipulation of a plurality of container units, the apparatus comprising:

a cryochamber including a cryo-access port, the cryochamber being electrically cooled to cryogenic temperatures;

a unit holder located inside the cryochamber and being configured to hold a plurality of container units;

a user access area for selectively permitting access to a chosen container unit by an authenticated user who has been authenticated by the apparatus;

a warming station for at least partially thawing the contents of the chosen container; and a motive grasper for selectively removing the chosen container unit from the cryochamber through the cryo-access port, placing the chosen unit in at least one of the warming station and the user access area.

Example aspect 2. The apparatus of example aspect 1, wherein the user access area allows access only to the chosen container unit, and wherein at least the cryochamber is secured within a housing configured to prevent user access and permit selected technician access.

Example aspect 3. The apparatus of example aspect 1, wherein the plurality of container units are removably held within the cryochamber via at least one cartridge.

Example aspect 4. The apparatus of example aspect 3, wherein at least one cartridge is replaceable within the cryochamber by a separately provided replacement cartridge during maintenance of the system.

Example aspect 5 The apparatus of example aspect 4, wherein the unit holder is a carousel, and at least one cartridge is rotatably mounted within the cryochamber via the carousel, the carousel being configured to selectively position the at least one cartridge with the chosen container unit, carried by the at least one cartridge, in operative alignment with the cryo-access port.

Example aspect 6. The apparatus of example aspect 5, wherein an actuator revolver interfaces with an outer rim of the unit holder and thereby rotates the carousel.

Example aspect 7. The apparatus of example aspect 1, wherein an actuator revolver is inserted into the cryo-access port to interface with a feature of the unit holder and thereby rotate the carousel, the actuator revolver being inserted into the cryochamber only during the active retrieval of the chosen container unit from the cryochamber.

Example aspect 8. The apparatus of example aspect 1, wherein the cryochamber is electrically cooled via a Stirling engine.

Example aspect 9. The apparatus of example aspect 8, including an elongate heat exchanger penetrating longitudinally through at least a portion of an interior of the cryochamber.

Example aspect 10. The apparatus of example aspect 9, wherein the elongate heat exchanger is configured to promote density-driven circulation within the cryochamber.

Example aspect 11. The apparatus of example aspect 9, wherein frost accumulation on the elongate heat exchanger is at least partially removed by selective application of at least one of electrical, pneumatic, or mechanical excitation thereon.

Example aspect 12. The system of example aspect 1, further comprising a motive grasper for transferring the chosen container unit among the cryochamber, the warming chamber, and the user access area.

Example aspect 13. The apparatus of example aspect 12, wherein the motive grasper extends through the cryo-access port only during the active retrieval of the chosen container unit from the cryochamber.

Example aspect 14. The apparatus of example aspect 12, wherein the motive grasper includes at least one grasping arm selectively manipulable laterally with respect to a central grasper axis.

Example aspect 15. The apparatus of example aspect 14, wherein the at least one grasping arm operatively engages a predetermined portion of the chosen container unit to move the chosen container unit.

Example aspect 16. The apparatus of example aspect 1, further including a network interface comprising a user interface that allows an authenticated user to request and receive a chosen container unit, and provides notification to the requesting user when the chosen container is in a thawed condition and ready for dispensing.

Example aspect 17. The apparatus of example aspect 16, wherein the network interface communicates at least one of real-time and historical information with an outside monitor regarding at least one of cryochamber temperature, apparatus humidity, cryochamber operating status, chosen container unit temperature, chosen container unit location, inventory status, access records, billing information, and user security data.

Example aspect 18. The apparatus of example aspect 17, wherein network interface inventory status communication includes notice to refill when inventory is below a predetermined level.

Example aspect 19. The apparatus of example aspect 17, wherein network interface billing information communication is triggered by removal of a chosen container unit from the cryochamber.

Example aspect 20. The apparatus of example aspect 1, wherein the authenticated user provides authentication information to the system via the user interface by at least one of a biometric identification device, an RFID scanner, and an identification and password.

A person having ordinary skill in the art will also understand that an example aspect 21 includes method of cryostorage and manipulation of a plurality of container units, the method comprising:

providing an apparatus including a cryochamber having an access port, a unit holder located inside the cryochamber, a user access area, and a motive grasper;

electrically cooling the cryochamber to cryogenic temperatures;

holding a plurality of container units at the cryogenic temperatures with the unit holder;

responsive to an order by an authenticated user, selectively removing a chosen container unit from the cryochamber through the cryo-access port with the motive grasper;

warming the chosen container unit to a thawed condition;

selectively placing the chosen container unit into the user access area with the motive grasper; and selectively permitting access by the authenticated user to the chosen container unit when the chosen container unit is in the user access area.

Example aspect 22. The method of example aspect 21, including:

removably holding the plurality of container units within the cryochamber via at least one cartridge;

rotatably mounting the at least one cartridge within the cryochamber via a carousel type unit holder; and selectively positioning the at least one cartridge with the chosen container unit, carried by the at least one cartridge, in operative alignment with the motive grasper via motion of the carousel type unit holder.

Example aspect 23. The method of example aspect 22, including replacing the at least one cartridge within the cryochamber with a separately provided replacement cartridge during maintenance of the system.

Example aspect 24. The method of example aspect 22, including the step of shielding the cartridge and cryo-access port from ambient humid air during cartridge replacement.

Example aspect 25. The method of example aspect 22, including selectively permitting access to the cryochamber by an authorized technician for maintenance of the system.

Example aspect 26. The method of example aspect 21, including:

selectively occluding the cryo-access port with a cover in a closed position;

rotatably mounting the at least one cartridge within the cryochamber via a carousel type unit holder;

selectively moving the cover to an open position to permit access to an interior of the cryochamber via the cryo-access port; and with the cover in the open position, extending an actuator revolver into the cryo-access port to interface with a feature of the unit holder and thereby rotate the carousel, such insertion of the actuator revolver only occurring during active retrieval of the chosen container unit from the cryochamber.

Example aspect 27. The method of example aspect 21, including controlling a metric associated with the warming step to thaw the chosen container unit to a thawed condition.

Example aspect 28. The method of example aspect 21, wherein at least one of selectively removing a chosen container unit from the cryochamber through the cryo-access port with the motive grasper, and selectively placing the chosen container unit into the user access area with the motive grasper includes:

moving at least one grasping arm laterally outward from a central grasper axis to place the motive grasper in an open condition;

orienting the at least one grasping arm in lateral alignment with a predetermined portion of the chosen container unit;

with the at least one grasping arm laterally aligned with the chosen container unit, moving the at least one grasping arm laterally inward toward the central grasper axis into a closed condition to operatively engage the chosen container unit; and with the motive grasper in the closed condition and operatively engaged with the chosen container unit, moving the motive grasper to relocate the chosen container unit.

Example aspect 29. The method of example aspect 21, further comprising the steps of validating container units before dispensing by at least one of weighing, scanning unit data, measuring temperature, calculating a time in process steps since removal from cryochamber, and obtaining validation data from a remote monitor via a network interface.

Example aspect 30. The method of example aspect 21, including conveying information to, and receiving inputs from, a user via a user interface of the apparatus; and actuating at least one of the cryochamber, the unit holder, the user access area, and the motive grasper responsive to the inputs from the user via a control system of the apparatus.

Example aspect 31. The method of example aspect 30, further comprising the step of notifying a user when a chosen container unit is ready for access (dispensing).

Example aspect 32. The method of example aspect 30, further comprising the steps of monitoring the time between notification of access readiness and dispensing access authentication; and preventing such access if said time exceeds a predetermined expiration time limit; and depositing any said access-prevented container units in a waste area within the apparatus; and notifying user of said prevention.

Example aspect 33. The method of example aspect 21, wherein the authenticated user is a first authenticated user having a first level of access associated with the apparatus, the method further comprising allowing a second authenticated user, having a second level of access associated with the apparatus, to remotely access at least one of real-time and historical information regarding at least one of cryochamber temperature, apparatus humidity, cryochamber operating status, chosen container unit temperature, chosen container unit location, inventory status, access records, order status for a plurality of orders associated with container units dispensed by the apparatus, billing and prescription information for the plurality of orders, and user security data.

Example aspect 34. The method of example aspect 21, wherein the producer-supplier of the container units and materials within, retains ownership of the apparatus installed at a user facility and provides at least one of monitoring, maintenance, and stocking services for the apparatus.

Example aspect 35. The method of example aspect 21, including the step of transferring ownership of a container unit from the manufacturer to a user upon removal of the container unit from the cryochamber of the apparatus.

Example aspect 36. The method of example aspect 21, the method further comprising generating, in response to removal of a chosen unit from the cryochamber, at least one of an invoice for a cost of the chosen container unit and documentation certifying a change in ownership of the chosen container unit.

Example aspect 37. The method of example aspect 21, wherein inventory below a predetermined level generates a notice to a remote monitor to initiate a refill service.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, and/or other means and options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. A blockchain or other tracking system could be used to record and/or authenticate cold chain of custody for each container unit 202. One or more container units 202 could be provided with active or passive temperature sensors, and/or with an ability to report any desired information about themselves to an external (to the container unit) system. A technician type user may access the interior of the housing 106 via one or more selectively openable panels; it is contemplated that the cryochamber 208 and any other desired components could manually or automatically slide at least partially out of the housing 100, similar to a dishwasher door-and-rack technique. Pneumatic, electric, or other desired features could be provided to periodically clear frost from the heat exchanger 324 or other components of the apparatus 100. An auxiliary backup power unit could be provided to selectively interface with the apparatus. One or more cameras or other visual sensors could be provided, inside and/or outside the housing 106, to capture images and/or video of the components of the apparatus 100 in operation or in standby, for the benefit of remote querying/diagnostics, so that a remote technician can operate and/or observe all or portions of the apparatus 100. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, Appendix A below, and the appended claims.

We claim:

1. An apparatus for cryostorage and manipulation of a plurality of container units, the apparatus comprising:
    a cryochamber including a cryo-access port, the cryochamber being electrically cooled at cryogenic temperatures;
    a unit holder located inside the cryochamber and being configured to hold a plurality of container units, the unit holder being a carousel;
    a user access area for selectively permitting access to a chosen container unit by an authenticated user who has been authenticated by the apparatus; and
    a motive grasper for selectively removing the chosen container unit from the cryochamber through the cryo-access port, and selectively placing the chosen container unit into the user access area;
    wherein the plurality of container units is removably held within the cryochamber via at least one cartridge, at least one cartridge being rotatably mounted within the cryochamber via the carousel, the carousel being configured to selectively position the at least one cartridge with the chosen container unit, carried by the at least one cartridge, in operative alignment with the motive grasper and
    wherein an actuator revolver is inserted into the cryo-access port to interface with a feature of the unit holder and thereby rotate the carousel only during the active retrieval of the chosen container unit from the cryochamber.

2. The apparatus of claim 1, wherein an interior of the cryochamber is maintained at cryogenic temperatures via exclusively electrically powered cooling techniques, with no fluid coolant provided to the cryochamber that is not a working fluid for electrical cooling.

3. The apparatus of claim 1, including a housing substantially enclosing the cryochamber, unit holder, user access area, and motive grasper, selectively preventing user access to at least a portion of an interior of the housing, and selectively permitting technician access to at least a portion of the interior of the housing other than the user access area.

4. The apparatus of claim 3, including a warming chamber configured to at least partially warm the chosen container unit toward a thawed condition, the warming chamber being located inside the housing.

5. The apparatus of claim 1, including a user interface configured to remotely and/or directly convey information to, and receive inputs from, at least one of an outside monitor and the authenticated user, and a control system configured to actuate at least one of the cryochamber, the unit holder, the user access area, and the motive grasper responsive to the inputs from the authenticated user.

6. The apparatus of claim 1, including a network interface communicating at least one of real-time and historical information with an outside monitor regarding at least one of cryochamber temperature, apparatus humidity, cryochamber operating status, chosen container unit temperature, chosen container unit location, inventory status, access records, and user security data.

7. The apparatus of claim 1, wherein a selected container unit contains at least one of cell therapy based treatments, gene therapy based treatments, and gene modified cell therapy based treatments.

8. A system for dispensing cryogenically stored materials, the system comprising:
the apparatus of claim 1;
a user interface that allows an authenticated user to request a chosen container unit; and
a warming chamber that, in response to the request, heats the chosen container unit until a thawed condition is achieved;
wherein the authenticated user can retrieve the chosen container unit which is in the thawed condition, upon providing authentication information to the system; and
wherein the system provides a notification to the user when the thawed condition is achieved.

9. A system for dispensing cryogenically stored materials, the system comprising:
the apparatus of claim 1;
a user interface that allows an authenticated user to request a chosen container unit;
a network interface configured to communicate with a remote computer system;
a warming chamber that, in response to the request, heats the chosen container unit until a thawed condition is achieved; and
wherein the authenticated user can retrieve the chosen container unit which is in the thawed condition, upon providing authentication information to the system.

10. The apparatus of claim 1, including a warming chamber configured to at least partially warm the chosen container unit toward a thawed condition, the motive grasper selectively moving the chosen container unit between the cryochamber, the warming chamber, and the user access area.

11. The apparatus of claim 10, wherein the warming chamber includes a warming grasper configured to provide at least one of heat and agitating motion to the chosen container unit.

* * * * *